US012763563B2

(12) United States Patent
Conlon et al.

(10) Patent No.: US 12,763,563 B2
(45) Date of Patent: Oct. 13, 2026

(54) LATCH AND METHOD OF INSERTING A LATCH INTO AN APERTURE

(71) Applicant: NYLACAST ENGINEERED PRODUCTS LIMITED, Birmingham (GB)

(72) Inventors: Gordon Conlon, Leicester (GB); Sheldon Shaun Jeffrey, Leicester (GB)

(73) Assignee: Nylacast Engineered Products Limited, Birmingham (GB)

( * ) Notice: Subject to any disclaimer, the term of this patent is extended or adjusted under 35 U.S.C. 154(b) by 278 days.

(21) Appl. No.: 18/370,355

(22) Filed: Sep. 19, 2023

(65) Prior Publication Data

US 2024/0006863 A1 Jan. 4, 2024

Related U.S. Application Data

(63) Continuation of application No. PCT/GB2022/000028, filed on Mar. 18, 2022.

(30) Foreign Application Priority Data

Mar. 19, 2021 (GB) ..................................... 2103881

(51) Int. Cl.
*H02G 3/22* (2006.01)
*F03D 80/80* (2016.01)
(Continued)

(52) U.S. Cl.
CPC ................. *H02G 3/22* (2013.01); *H02G 1/10* (2013.01); *H02G 15/013* (2013.01); *F03D 80/85* (2016.05); *F05B 2240/95* (2013.01)

(58) Field of Classification Search
None
See application file for complete search history.

(56) References Cited

U.S. PATENT DOCUMENTS 3,813,177 A * 5/1974 Cartwright ............... H02G 1/10 403/325
3,993,333 A * 11/1976 Biswas ................ H02G 3/0616 285/382
(Continued)

FOREIGN PATENT DOCUMENTS

CN 109004593 A * 12/2018 ........... H02G 3/0406
EP 1710450 A1 * 10/2006 ................ F16B 2/16
(Continued)

OTHER PUBLICATIONS

Original and Translation of GB2479771 (Year: 2011).*
(Continued)

*Primary Examiner* — Timothy J. Dole
*Assistant Examiner* — Muhammed Azam
(74) *Attorney, Agent, or Firm* — Cooper Legal Group LLC

(57) ABSTRACT

A latch comprises a body having a forward end, a rearward end and a longitudinal axis, configured to be inserted into an aperture by its forward end in a first direction parallel to the longitudinal axis. The body comprises an inner part, and an annular outer housing surrounding at least part of the inner part and rotatable around the inner part. Latch fingers are moveably attached to the outer housing, each latch finger moveable between a closed and an open position, such that in the open position a latch finger prevents removal of the body from the aperture in the direction opposite to the first direction. A guide may be attached to the body and configured to bias the rotation of the outer housing, when the body is inserted into an aperture, to a predetermined rotational position, thereby also locating the latch fingers in a the predetermined rotational position.

18 Claims, 20 Drawing Sheets

(51) Int. Cl.
*H02G 1/10* (2006.01)
*H02G 15/013* (2006.01)

(56) References Cited

U.S. PATENT DOCUMENTS

| | | | | | |
|---|---|---|---|---|---|
| 4,005,882 | A * | 2/1977 | Rickel | F16L 5/00 285/23 |
| 4,435,125 | A * | 3/1984 | Cook | F03D 13/20 416/142 |
| 4,692,957 | A * | 9/1987 | Kovacs | B08B 9/045 254/134.3 FT |
| 6,329,601 | B1 * | 12/2001 | Bulford | H02G 15/076 174/91 |
| 7,048,257 | B2 * | 5/2006 | Wentworth | E21B 19/084 254/326 |
| 9,086,174 | B2 * | 7/2015 | McConnell | E04B 5/48 |
| 9,103,116 | B2 * | 8/2015 | McConnell | E04B 1/947 |
| 9,273,523 | B2 * | 3/2016 | McIntosh | E21B 3/022 |
| 9,316,804 | B2 * | 4/2016 | Badura | H02G 15/113 |
| 9,404,319 | B2 * | 8/2016 | Springett | H02G 1/10 |
| 10,784,662 | B2 * | 9/2020 | Andreasen | H02G 9/02 |
| 12,018,451 | B2 * | 6/2024 | Curry | E02B 17/0008 |
| 2005/0249040 | A1 * | 11/2005 | Luc | G01V 1/20 367/178 |
| 2011/0226527 | A1 * | 9/2011 | Ritchie-Bland | F16L 35/00 174/669 |
| 2018/0034254 | A1 * | 2/2018 | Thomson | H02G 1/10 |
| 2018/0306222 | A1 * | 10/2018 | Preston | H02G 9/12 |
| 2020/0271263 | A1 * | 8/2020 | Hughes | F03D 80/85 |

FOREIGN PATENT DOCUMENTS

| | | | | | |
|---|---|---|---|---|---|
| EP | 2169177 | A1 * | 3/2010 | E21B 17/06 |
| GB | 2463940 | A * | 4/2010 | F16L 5/00 |
| GB | 2567907 | A | 5/2019 | |
| JP | 2021023090 | A * | 2/2021 | E02B 17/027 |
| WO | WO-2009025832 | A1 * | 2/2009 | E21B 3/022 |
| WO | WO-2011131918 | A1 * | 10/2011 | F16L 5/02 |
| WO | 2016128739 | A1 | 8/2016 | |
| WO | WO-2017211815 | A1 * | 12/2017 | H02G 3/0481 |
| WO | 2018115056 | A1 | 6/2018 | |
| WO | WO-2019058093 | A1 * | 3/2019 | H02G 15/007 |

OTHER PUBLICATIONS

Original and Translation of DE202014103976 (Year: 2020).*
Original and Translation of EP2329174 (Year: 2016).*
Original and Translation of JP2021023090 (Year: 2021).*
Corresponding International Patent Application No. PCT/GB2022/000028, International Search Report, date mailed Jun. 21, 2022.
Corresponding International Patent Application No. PCT/GB2022/000028, Written Opinion, date mailed Jun. 21, 2022.

* cited by examiner

LATCH AND METHOD OF INSERTING A LATCH INTO AN APERTURE

CROSS REFERENCE TO RELATED APPLICATIONS

This application is a continuation of International Patent Application No. PCT/GB2022/000028, filed on 18 Mar. 2022, which claims priority from UK Patent Application No. 21 03 881.5, filed on 19 Mar. 2021. International Patent Application No. PCT/GB2022/000028 and UK Patent Application No. 21 03 881.5 are incorporated herein by reference.

BACKGROUND OF THE INVENTION

The present invention relates to a latch for insertion into an aperture.

When building offshore wind turbines, it is necessary to connect them to the shore or to an offshore substation by cabling buried in the seabed. For turbines having fixed foundations, such as monopiles, the cable must pass through the wall of the foundation and rise to the generator. Typically, a latch is used to attach the cable to the wall. This may be known as a latch mechanism, a mechanical latch, a cable protection system latch, and so on.

However, due to the fact that the cable rises from the seabed to connect to a monopile or other foundation, the aperture in the wall is generally at an angle to the wall of less than 90°, and thus the latch is also at an angle to the wall. Typical latches include a number of spring-loaded latch fingers, and work on the assumption that at least two of these will engage with the inside of the wall and prevent removal of the latch from the aperture. However, this causes uneven load on the engaged latch fingers, and allows the latch to rattle within the aperture causing further stress to the fingers. Stress fatigue on the fingers may eventually result in failure of the latch.

It is therefore an object of the invention to provide an improved latch suitable for insertion into an aperture.

BRIEF SUMMARY OF THE INVENTION

According to a first aspect of the present invention, there is provided a latch, comprising: a body having a forward end, a rearward end and a longitudinal axis, configured to be inserted into an aperture by its forward end in a first direction parallel to said longitudinal axis, said body comprising: an inner part, and an annular outer housing surrounding at least part of said inner part and rotatable around said inner part; and a plurality of latch fingers moveably attached to said outer housing, each latch finger moveable between a closed and an open position, such that in the open position a latch finger prevents removal of said body from the aperture in the direction opposite to said first direction.

In an embodiment, the latch further comprises a guide attached to said body and configured to bias the rotation of said outer housing, when said body is inserted into an aperture, to a predetermined rotational position, thereby also locating said latch fingers in said predetermined rotational position. The guide may be configured to bias the rotation of said outer housing to any of a plurality of predetermined rotational positions.

According to a second aspect of the present invention, there is provided a method of locating a latch within an aperture in a wall, said latch comprising: a body having a forward end, a rearward end and a longitudinal axis, configured to be inserted into an aperture by its forward end in a first direction parallel to said longitudinal axis, said body comprising: an inner part, and an annular outer housing surrounding at least part of said inner part and rotatable around said inner part; and a plurality of latch fingers moveably attached to said outer housing, each latch finger moveable between a closed and an open position, such that in the open position a latch finger prevents removal of said body from the aperture in the direction opposite to said first direction; the method comprising the steps of: inserting the body of said latch into said aperture; continuing insertion of said body while allowing said guide to rotate until the outer housing has reached one of said predetermined positions; and continuing insertion of said body until a plurality of said latch fingers are in an open position, preventing removal of said body from said aperture.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
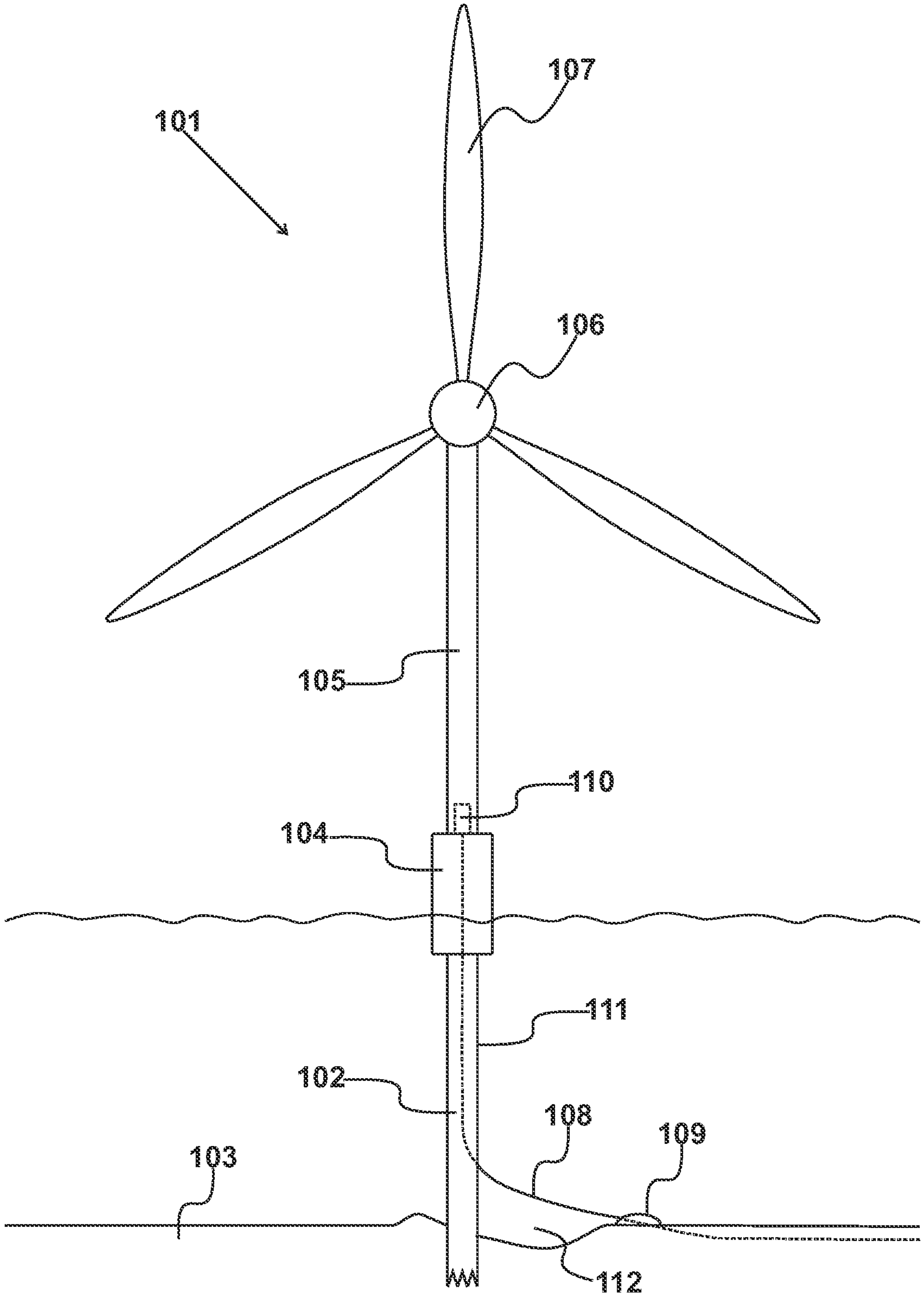
FIG. 1 illustrates an environment in which the invention may be used.

A wind turbine 101 is of a type known as a monopile turbine. It comprises a monopile 102 embedded in the seabed 103. A transition piece 104 is attached to the top of monopile 102, and a tower 105 is on top of transition piece 104. Tower 105 comprises the generator 106 and blades 107. The foundation of the monopile descends below the seabed and is not shown here.

Cable 108 connects turbine 101 to the rest of the wind farm, allowing generated energy to be provided to a transformer station. The cable runs under the seabed, exits the seabed under a protective structure 109, passes through the scour area 112, and enters the monopile 102, terminating at a control box 110. Further cabling (not shown) runs through the tower to connect the control box to the generator.

Monopile 102 is a hollow steel tube 5 m in diameter, and the thickness of the wall 111 is 15 cm. Cable 108 passes through an aperture in wall 111 and is latched in place as will be described with reference to FIG. 2.

FIG. 2

Figure 2:
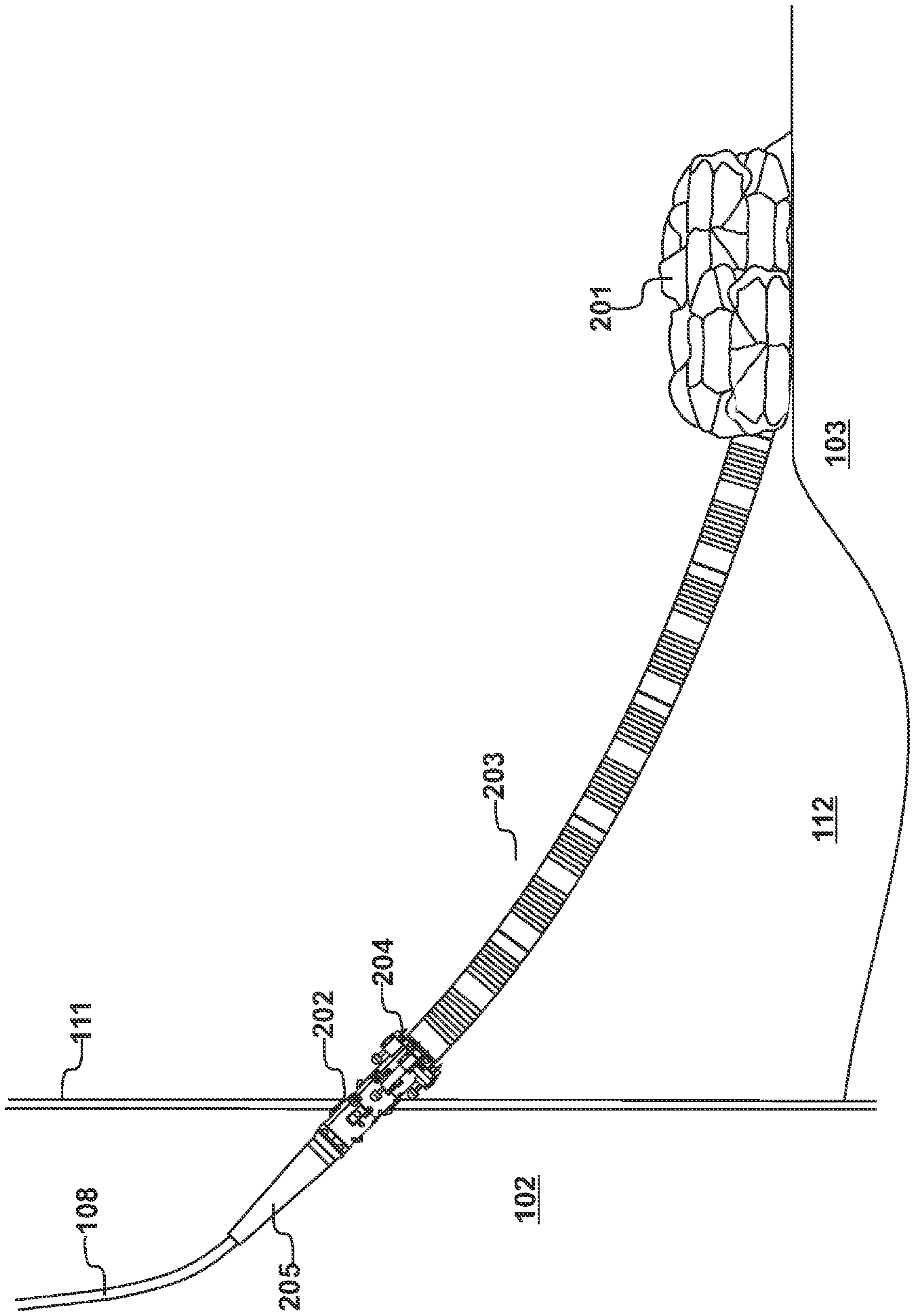
FIG. 2 illustrates a cable and cable protection entering a monopile shown in FIG. 1.

FIG. 2 illustrates a portion of the wall 111 of monopile 102, and the free span of cable 108 in scour area 112. As is typical, the cable is protected from scouring by rocks 201 at the point where it exits seabed 103. There is then a free span of a few metres before the cable enters angled aperture 202 in wall 111.

The bend of cable 108 needs to be restricted in scour area 112, as otherwise the movement of the cable caused by the waves would cause kinking and breakage. Restriction in this example is provided by bend restrictor 203 around cable 108, although other suitable cable protection could be used. The bend restriction means that it is not possible, given the short free span, for cable 108 to bend in such a way to allow it to enter monopile wall 111 at an angle orthogonal to the wall. Additionally, the free span should be as short as possible to minimise potential damage to the cable. For this reason, the axis of aperture 202 is at an acute angle with respect to wall 111, typically around 45°.

Bend restrictor 203 is latched to monopile wall 111 using latch 204, through which cable 108 runs, which prevents movement of bend restrictor 203 in a direction towards or away from aperture 202, and protects cable 108 as it passes through aperture 202. A bend stiffener 205 is attached to the front end of latch 204 to prevent cable 108 kinking as it exits the latch. Cable 108 can pass freely through bend restrictor 203, latch 204 and bend stiffener 205, to allow it to be pulled upwards during installation of wind turbine 101 to control box 110.

Figure 3:
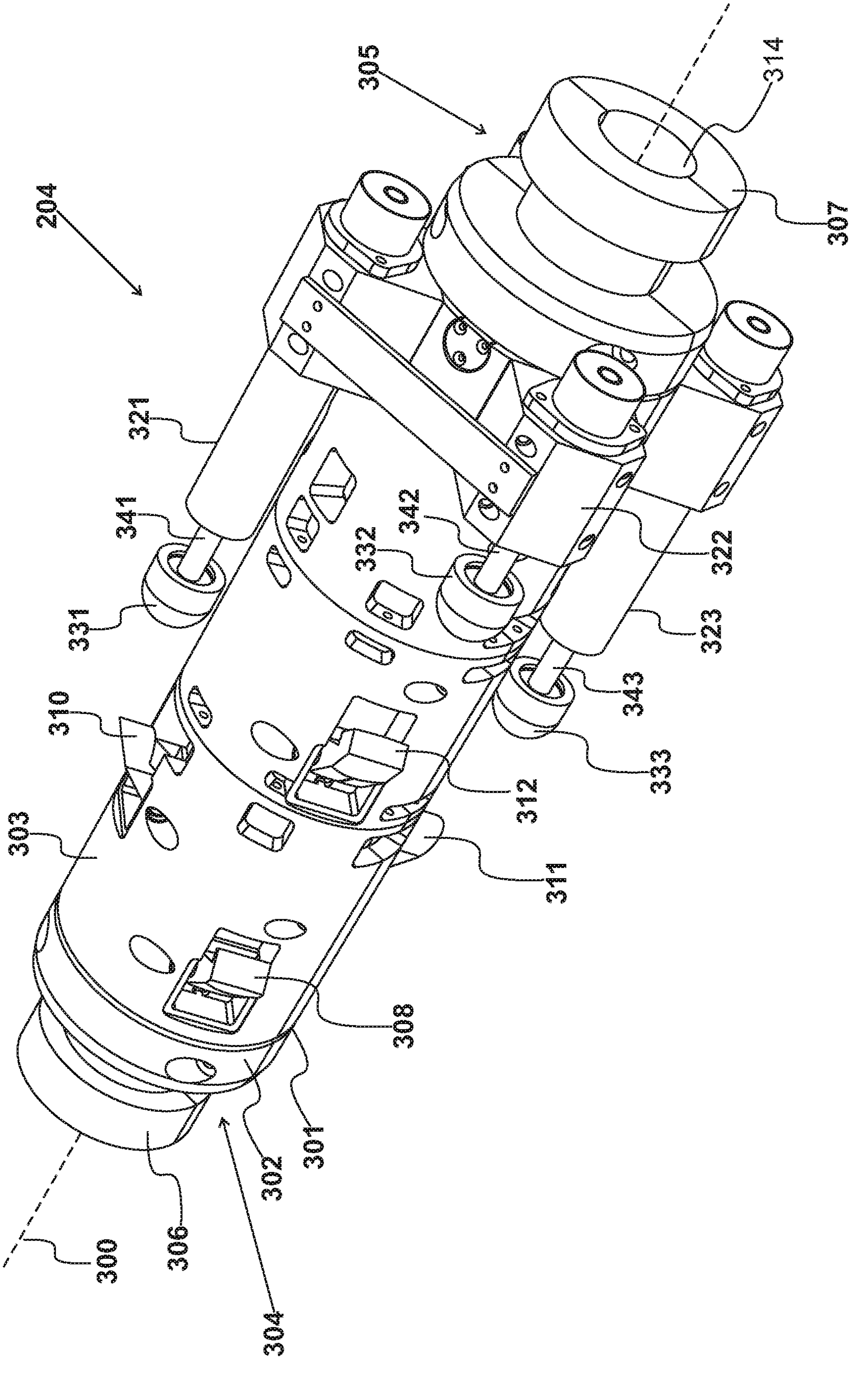
FIG. 3 is an illustration of a latch shown in FIG. 2.
Figure 4:
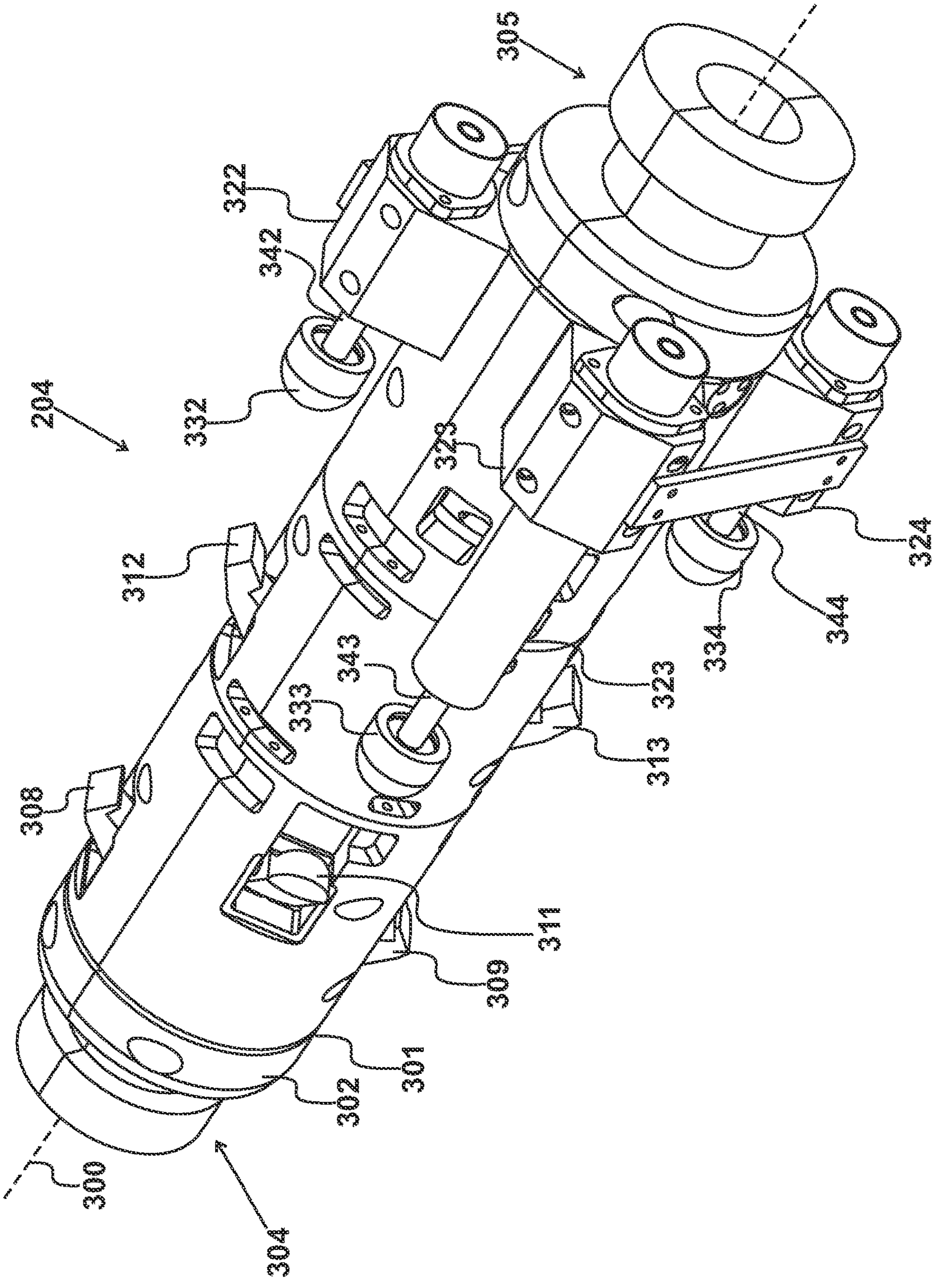
FIG. 4 is another illustration of the latch shown in FIG. 2.

FIGS. 3 and 4

FIGS. 3 and 4 illustrate latch 204 in its unattached state, viewed from different angles. Body 301 is configured to be inserted into aperture 202, and comprises an inner housing 302, and an annular outer housing 303, which is free to rotate around a central part of inner housing 302 with respect to a longitudinal axis 300 of body 301. In this example latch is around 130 cm in length. Body 301 is around 29 cm in diameter, to fit an aperture of around 30 cm diameter. The whole apparatus is around 50 cm in diameter. However, the invention can be used for any size of latch.

Body 301 has a forward end 304 and a rearward end 305, defined with respect to the way in which body 301 is to be inserted into aperture 202—in the direction of longitudinal axis 300, forward end 304 first. At forward end 304, inner housing 302 defines a knuckle 306 for connection to bend stiffener 205, while at rearward end 305 inner housing 302 defines a knuckle 307 for connection to bend restrictor 203.

Inner housing 302 defines a cylindrical internal bore 314 through which cable 108 is passed. Thus, when latch is attached to a bend restrictor and a bend stiffener, or other cable protection, around a cable, outer housing 303 is free to rotate while inner housing 302, the cable and the cable protection remain in place.

Mounted on outer housing 302 are six latch fingers 308, 309, 310, 311, 312, and 313. The latch fingers are arranged in three rows of two, the latch fingers in each row being opposite each other. In the top row, ie the row closest to front end 304, are latch fingers 308 and 309; in the middle row are latch fingers 310 and 311; in the bottom row, ie the row furthest from front end 304, are latch fingers 312 and 313. Latch fingers 308 and 312 are aligned with each other along a line parallel to longitudinal axis 300, as are latch fingers 309 and 313. Latch fingers 310 and 311 are in a position rotated 90° from those in the top and bottom rows.

The latch fingers are rotatably mounted at their top end on pins attached to outer housing 303, as will be further described with reference to FIG. 15, and may be in a closed or open position. They are biased using a torsion spring to an open position, which is that shown in FIGS. 3 and 4. When body 301 is passed through aperture 202, forward end 304 first, they are forced into a closed position as they pass through the aperture, in which position they do not protrude beyond the circumference of body 301. Once through the aperture they return to the open position, and in that position any latch fingers that are in contact with the inner surface of the monopile wall engage with the wall to prevent removal of the body from the aperture in the opposite direction.

In prior art latches, such latch fingers are fixed in their rotational position, and therefore it is a matter of luck, when inserting a latch into an angled aperture, which and how many fingers engage with the wall. However, in the invention described herein, the latch fingers are mounted on outer housing 303 which is free to rotate, and therefore the latch fingers can be moved into a rotational position relative to the wall 111 that allows an optimal number of fingers to be engaged. In the embodiment shown in FIGS. 3 and 4, one latch finger from the top row and one latch finger from the bottom row will be engaged, plus both latch fingers from the middle row, as will be described with respect to FIG. 9. In addition, because their rotational position can be specified, the latch fingers can be profiled so as to present the largest possible engagement surface to the wall.

In this embodiment, latch 204 further includes a guide 320 attached to body 301. The guide herein described comprises four buffers 321, 322, 323 and 324 located equidistantly around the circumference of body 301. Each buffer comprises a wheel mounted on an axle attached to outer housing 303 near the rearward end 305 of body 301. Thus buffer 321 comprises wheel 331 mounted on axle 341, buffer 322 comprises wheel 332 mounted on axle 342, buffer 323 comprises wheel 333 mounted on axle 343, and buffer 324 comprises wheel 334 mounted on axle 344. Wheels 331 to 334 have a hemispherical end, to maximise contact with the outer surface of wall 111.

The buffers are in opposite pairs, with buffers 321 and 323 forming one pair and buffers 322 and 324 forming another pair. In each pair, the wheels are opposite each other with respect to longitudinal axis 300, that is, they are the same distance from the end of the body; thus wheels 331 and wheels 333 are opposite each other, and wheels 332 and 334 are opposite each other. Each pair of wheels is offset from the other pair with respect to longitudinal axis 300, such that wheels 331 and 333 are closer to forward end 304 of body 301 than the other two. In this embodiment this is achieved by axles 341 and 343 being longer than axles 342 and 344, although it could equally be achieved by mounting one pair of buffers forward of the other pair. Thus, buffers 321 and 323 are referred to herein as the forward buffers, while buffers 322 and 324 are referred to as the rearward buffers.

The buffers are aligned with the latch fingers along a line parallel to longitudinal axis 300, as follows: buffer 321 is aligned with latch finger 310, buffer 322 is aligned with latch fingers 308 and 312, buffer 323 is aligned with latch finger 311, and buffer 324 is aligned with latch fingers 309 and 313.

As will be further described with reference to FIGS. 8 and 9, when body 301 is inserted into angled aperture 202, guide 320 guides the rotational position of outer housing 303 into one of two predetermined positions, thus locating the latch fingers in one of two predetermined positions, in either of which they are optimally placed to engage the inside of the wall.

Thus there is herein described a latch, which in this embodiment is latch 204, comprising a body 301 having a forward end 304, a rearward end 305 and a longitudinal axis 300, configured to be inserted into an aperture by its forward end in a first direction parallel to the longitudinal axis. The body comprises an inner part, which in this embodiment is inner housing 302, and an annular outer housing, which in this embodiment is outer housing 303, surrounding at least part of the inner part and rotatable around the inner part. It also comprises a plurality of latch fingers 308 to 313 moveably attached to the outer housing, each latch finger moveable between a closed and an open position, such that in the open position a latch finger prevents removal of the body from the aperture in the direction opposite to said first direction.

The latch may also comprise a guide, which in this example is guide 320, attached to the body and configured to bias the rotation of the outer housing, when the body is inserted into an aperture, to a predetermined rotational position, thereby also locating said latch fingers in said predetermined rotational position. There may be a plurality of predetermined rotational positions, and the guide biases the rotation of the outer housing to any one of them.

Alternatively, the latch may include a different guide, or may include another system for rotating the outer housing. For example, the outer housing may be manually moveable, either by a person or by a robot. As a further example, the latch may include a manually or automatically operated motor to drive rotation of the outer housing, and some form of feedback to indicate when a predetermined rotational position has been reached. There could be a camera, or sensors on the latches to provide an indication of when they are open or closed.

Figure 5:
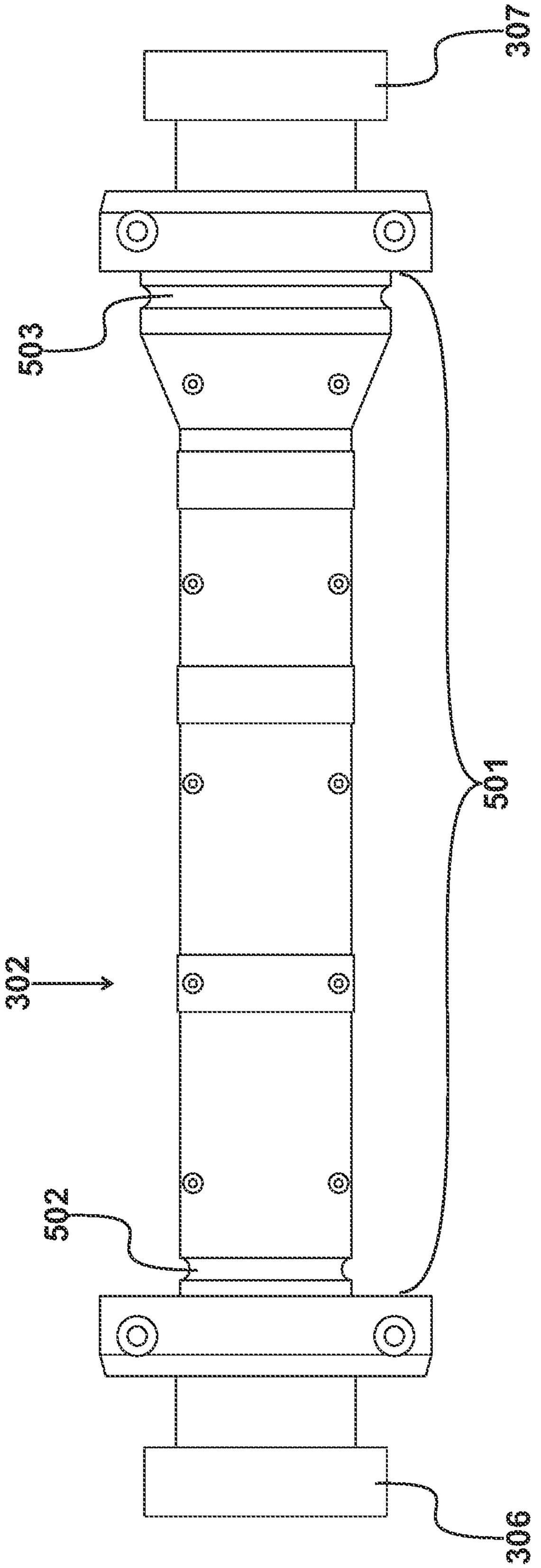
FIG. 5 illustrates an inner housing shown in FIG. 3.
Figure 6:
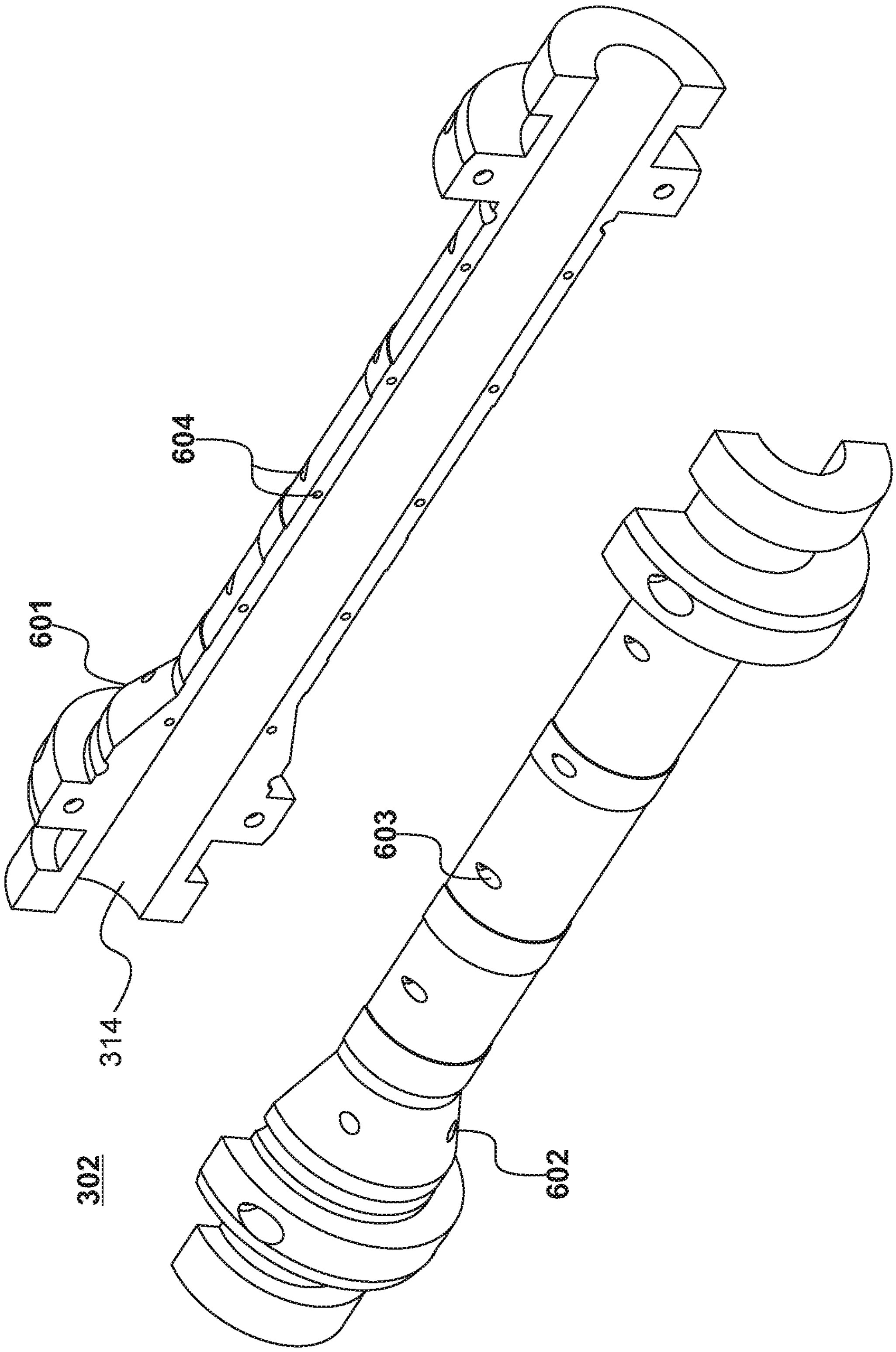
FIG. 6 is an illustration of the component parts of the inner housing shown in FIG. 5.

FIGS. 5 and 6

FIGS. 5 and 6 show inner housing 302 before outer housing 303 is placed around it. As shown in the side view of FIG. 5, it comprises a central portion 501 between knuckles 306 and 307, around which outer housing 303 is placed. At every point along central portion 501, its outer profile has a circular cross-section in order that outer housing 303 can rotate around it. Rotation is facilitated by two ball bearings, created by complementary grooves in the inner and outer housings. Grooves 502 and 503 on the outside of inner housing 302 are for this purpose.

Inner housing 302 is formed in two pieces, as shown in FIG. 6, which is a perspective view from the forward end. Half shells 601 and 602 are configured to be bolted together using bolt holes, such as complementary holes 603 and 604. In this embodiment the latch 204 is supplied in a single piece for cable 108 to be threaded through, but it could also be supplied in half-shells to allow it to be formed around the cable in situ.

In this embodiment, inner housing 302 defines an internal bore 314 to house cable 108, but in other embodiments, particularly if a latch is used to terminate a cable, it may be solid, in which case it would be more suitable for being formed in a single piece. Further, any suitable attachment means may replace the knuckles, depending on what is to be attached, which could be any form of cable protection, an unprotected cable, or anything else that requires latching in position.

FIG. 7

Figure 7:
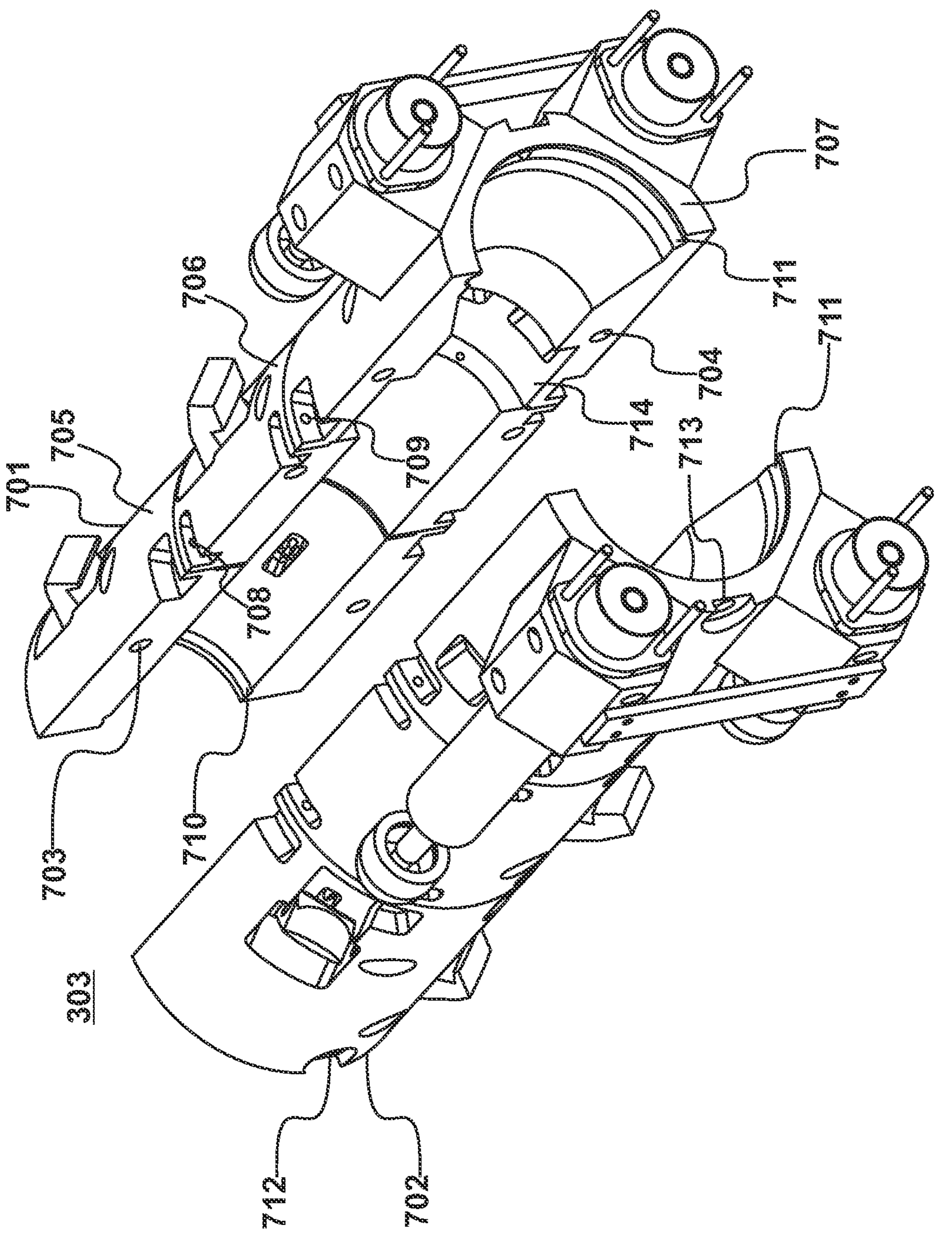
FIG. 7 is an illustration of the component parts of an outer housing shown in FIG. 3.

Outer housing 303 is also formed in two pieces, as shown in a perspective view from the rearward end in FIG. 7. Half shells 701 and 702 are bolted together around central portion 501 of inner housing 302 using bolt holes, such as bolt holes 703 and 704 in half-shell 701 and corresponding bolt holes in shell 702 that are not visible.

Each half shell is itself formed of three components, for ease of manufacture. For example, half-shell 701 is formed from components 705, 706 and 707. Components 705 and 706 are bolted together using bolt holes, such as bolt hole 708, and components 706 and 707 are bolted together using bolt holes, such as bolt hole 709.

The inner surface of outer housing 303 is shaped to be substantially complementary to the outer surface of central part 501 of inner housing 302. At every point along outer housing portion 303, its inner surface has a circular cross-section that is slightly larger than the corresponding part of inner housing 302, to allow it to rotate. Circumferential gap 714 is defined on the inner surface of outer housing 302. As will be described with reference to FIG. 12, this is to house part of an optional release mechanism.

As discussed with reference to FIG. 5, rotation is facilitated by two ball bearings, created by complementary grooves. Grooves 710 and 711 can be seen on the inside surface of half-shell 702, and they continue (not both visible in this Figure) on the inside surface of half-shell 701. Groove 710 is complementary with groove 502 on the outside of inner housing 302; similarly groove 711 is complementary with groove 503. Once outer housing 303 has been bolted around inner housing 302, balls and lubricant are introduced into the bearings at holes 712 and 713, after which the holes are capped as can be seen in FIG. 3.

FIG. 8

After cable 108 has been passed through bore 314 in latch 204 and cable protectors have been attached to knuckles 306 and 307, the cable can be pulled through aperture 202 in wall 111 (the installation of cable 108 in wind turbine 101 will be discussed in more detail with respect to FIG. 20).

Figure 8:
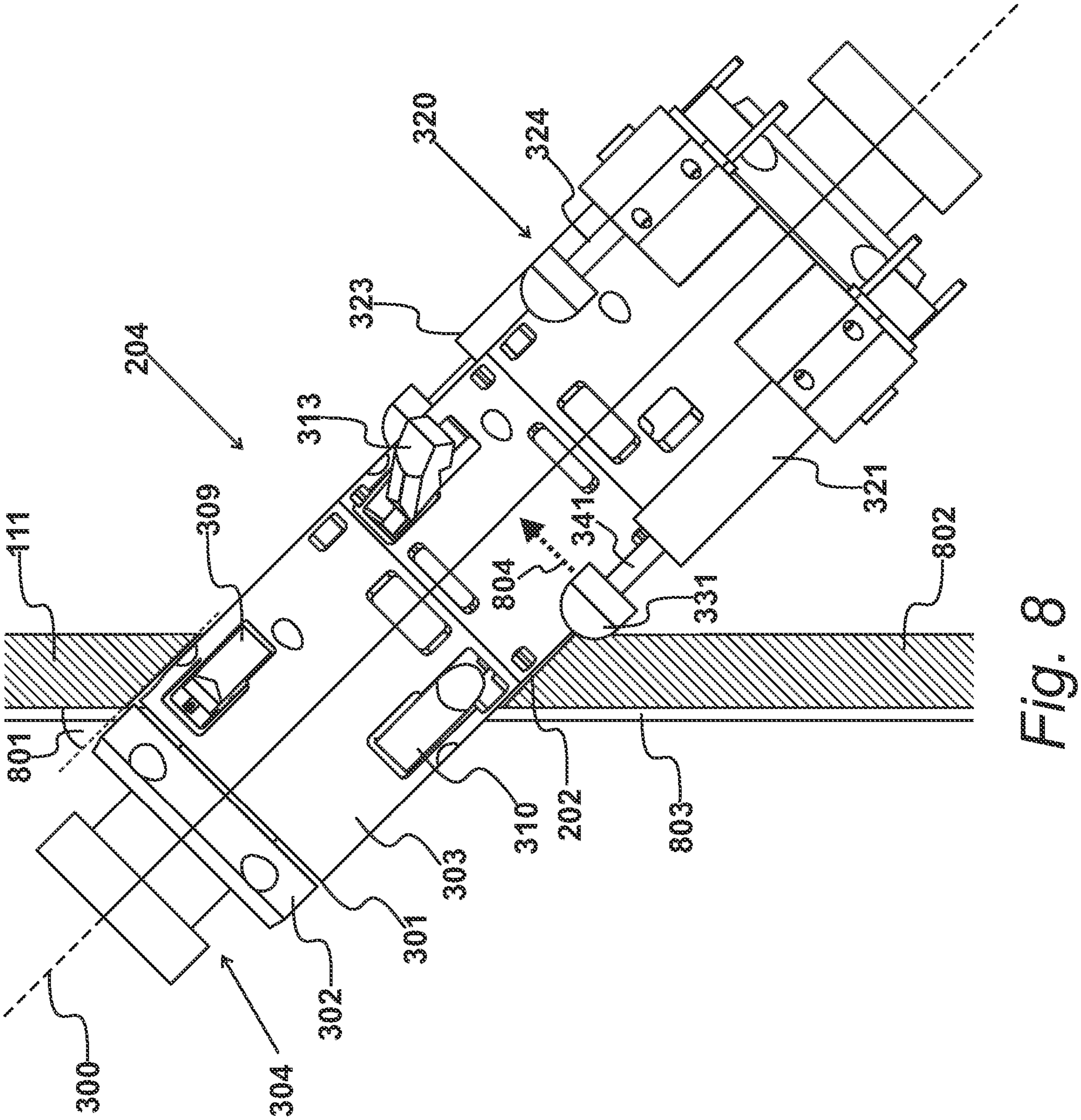
FIG. 8 is a side view with a partial cross-section of the latch and wall shown in FIG. 2.

FIG. 8 illustrates a side view of body 301 of latch being inserted into aperture 202 of curved wall 111, which is shown in cross-section. For clarity the cable and cable protectors are not shown in this and subsequent Figures.

Aperture 202 is at an angle 801 (meaning the sides of the aperture are at an angle) of approximately 45° from the outer surface 802 or inner surface 803 of wall 111, so that latch 204 is inserted at the same angle. Latch 204 is optimised for this angle; in other embodiments a latch may be optimised for a different angle.

Body 301 is inserted into aperture 202, forward end 304 first, in a direction parallel to its longitudinal axis 300. Latch fingers 308 to 313 are forced into their closed position as they pass through aperture 202, as shown in this Figure by latch fingers 309 and 310, and then return to their biased open position once through the aperture. Outer housing 303 is free to rotate around inner housing 302, such that when first inserted outer housing 303 may be in any rotational position. Guide 320 then guides the rotation of outer housing 303 into one of a set of predetermined positions, as will now be described.

The wheel of one of the forward buffers 321 or 323 will be the first part of guide 320 to come into contact with outer surface 802 of wall 111. In FIG. 8, wheel 331 of buffer 321 has contacted outer surface 802. The pulling of cable 108 continues to move body 301 through aperture 202, but wheel 331 prevents that movement unless outer housing 303 rotates. Therefore, outer housing 303 rotates around inner housing 302, to allow further movement of body 301 into aperture 202. This rotation is further facilitated by wheel 331 rotating on axle 341.

In this example the rotation is in a clockwise direction as shown by arrow 804, but outer housing 802 is free to rotate in either a clockwise or an anti-clockwise direction, as are wheels 331 to 334.

FIG. 9

Figure 9:
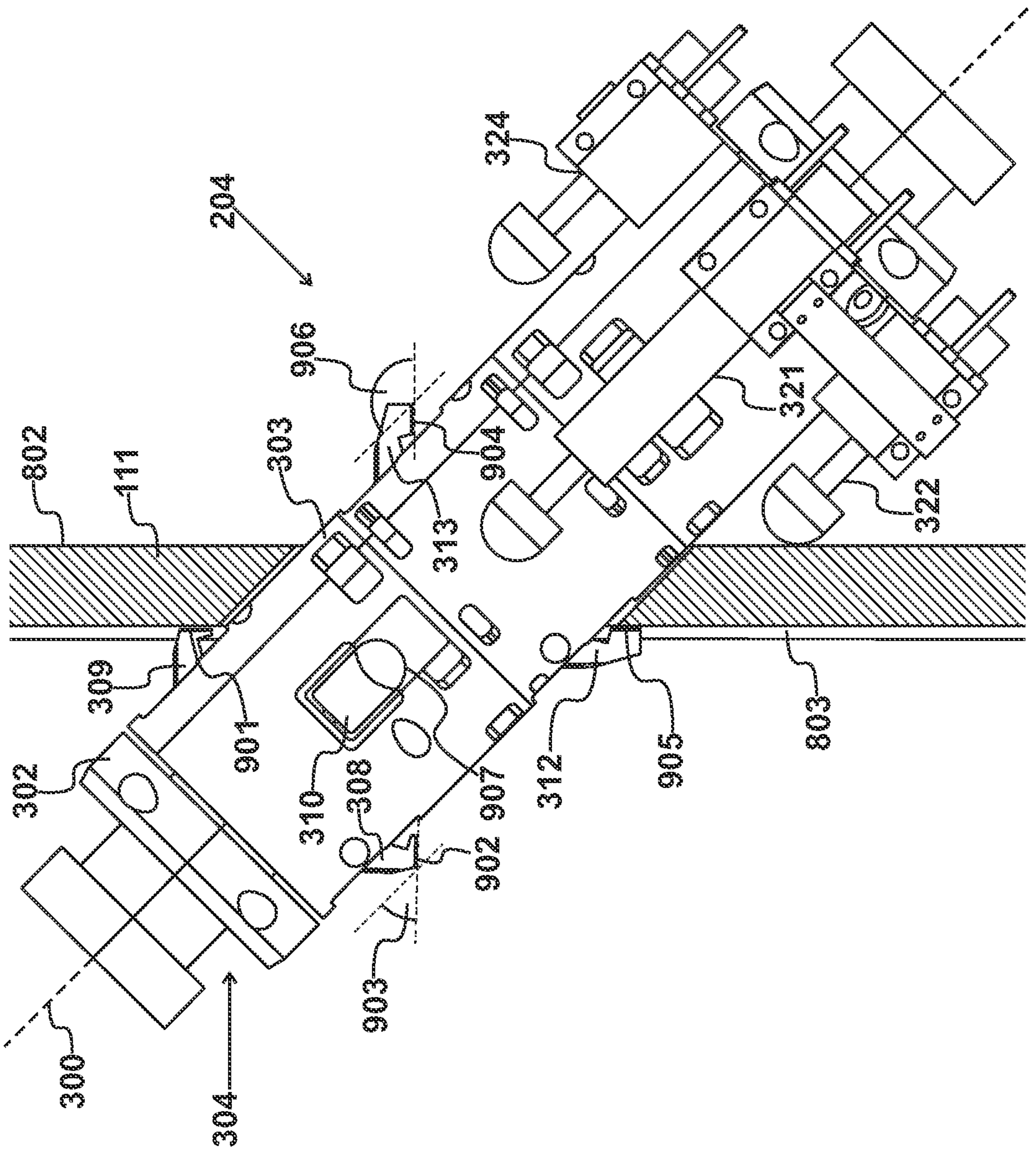
FIG. 9 is another side view with a partial cross-section of the latch and wall shown in FIG. 2.

FIG. 9 illustrates the final rotational position of outer housing 303, again as a side view of latch 204 with wall 111 in cross-section. While inner housing 302 has remained in the same rotational position, outer housing 303 has rotated until the wheels of buffers 321, 322 and 323 (not visible in this Figure) are in contact with outer surface 802 of wall 111, creating three points of contact between guide 320 and outer surface 802, around half of the circumference of body 301. The wheel of buffer 324 is not in contact with outer surface 802. It is no longer possible for outer housing 303 to rotate further in either direction.

If outer housing 303 had started in a different position, it might have instead rotated (in either direction) to the position where the wheels of buffers 321, 323 and 324 were in contact with outer surface 802.

There are therefore two rotational positions towards which outer housing 303 is biased by guide 320, and in each one rearward buffers 322 and 324, at the top and bottom of body 301, and forward buffers 321 and 323 are at each side. Because latch fingers 308 to 313 are aligned with the buffers, these are now similarly located at the top, bottom and sides of the body. The latch fingers are positioned and profiled for maximum engagement with inner surface 803, no matter which of the two rotational positions is assumed by outer housing 303.

In this example, top row latch finger 309 has engaged with inner surface 803 at the top of aperture 202, bottom row latch finger 312 has engaged at the bottom of aperture 202, and both middle row latch fingers 310 and 311 (not shown in this Figure) have engaged, one at each side of aperture 202. If the other rotational position had been assumed, then top row latch finger 308 and bottom row latch finger 313 would have engaged instead. Both middle row latch fingers always engage.

Each latch finger 308 to 313 is rotatably mounted at its top end on a pin within a recess in outer housing 303, and has a base that can engage with inner surface 803. Because the latch fingers always engage with inner surface 803 in the same rotational position and therefore at the same angle, their bases can be profiled for maximum engagement. Thus, top row latch finger 309 has a flat base 901, and top row latch finger 310 has a flat base 902, both of which are profiled for engagement with inner surface 802 at the top of aperture 202.

In this embodiment, where the longitudinal axis 300 of latch 204 is at approximately 45° to the walls of the aperture, this means that the flat bases 901 and 902 are also at approximately 45° to axis 300, when the latch fingers are open. Thus, the flat bases are at an acute angle, shown at angle 903, to longitudinal axis 300, when measured from forward end 304.

Similarly, bottom row latch fingers 312 and 313 have flat bases 904 and 905 respectively. These are profiled for engagement with inner surface 803 at the bottom of aperture 202, and therefore the bases are at an oblique angle, shown at angle 906, to longitudinal axis 300, when measured from forward end 304.

Because middle row latch fingers 310 and 311 engage with inner surface 803 on either side of aperture 202, their bases have a curved profile, such as base 907 of latch finger 310.

In other embodiments, where the aperture is at a different angle to the wall, or where there are more or fewer possible rotational positions that outer housing 303 can assume, the bases of the latch fingers would be profiled differently for maximum engagement with the inner surface of the wall.

Thus, in this embodiment, the guide is provided by four buffers, one pair of which is offset with respect to the other pair. These bias the rotation of outer housing into one of two predetermined rotational positions. In other embodiments, other guides could be used. For example, the ends of the buffers might not be wheels, if the outer surface of the wall were smooth enough to permit the buffer ends sliding across it. One of the rearward buffers in this embodiment could be further forward of the forward buffers, creating a complementary shape to the wall and thus creating a single possible rotational position. A single annular slanting buffer could be used. Alternatively, a single buffer that locates in one or more recesses in the wall would also bias the outer housing towards one or more predetermined positions. In other embodiments, the guide could comprise something other than buffers, in which case the latch could have a separate element to prevent the body being pulled all the way through the aperture.

FIG. 10

Once the engaging latch fingers have passed through aperture 202, they need to open and engage with inner surface 803 of wall 111 to facilitate latching. Rotation outwards from their closed position requires clearance between the bases of the fingers and inner surface 803. Thus, when guide 320 reaches the rotational position shown in FIG. 9, it may be necessary for body 301 to be further inserted into aperture 202 to allow the engaging latch fingers to open. To facilitate this, buffers 321 to 324 are compressible and spring-loaded, such that wheels 331 to 334 are biased towards forward end 304 of body 301, but may also be moved towards rearward end 305 of body 301.

Figure 10:
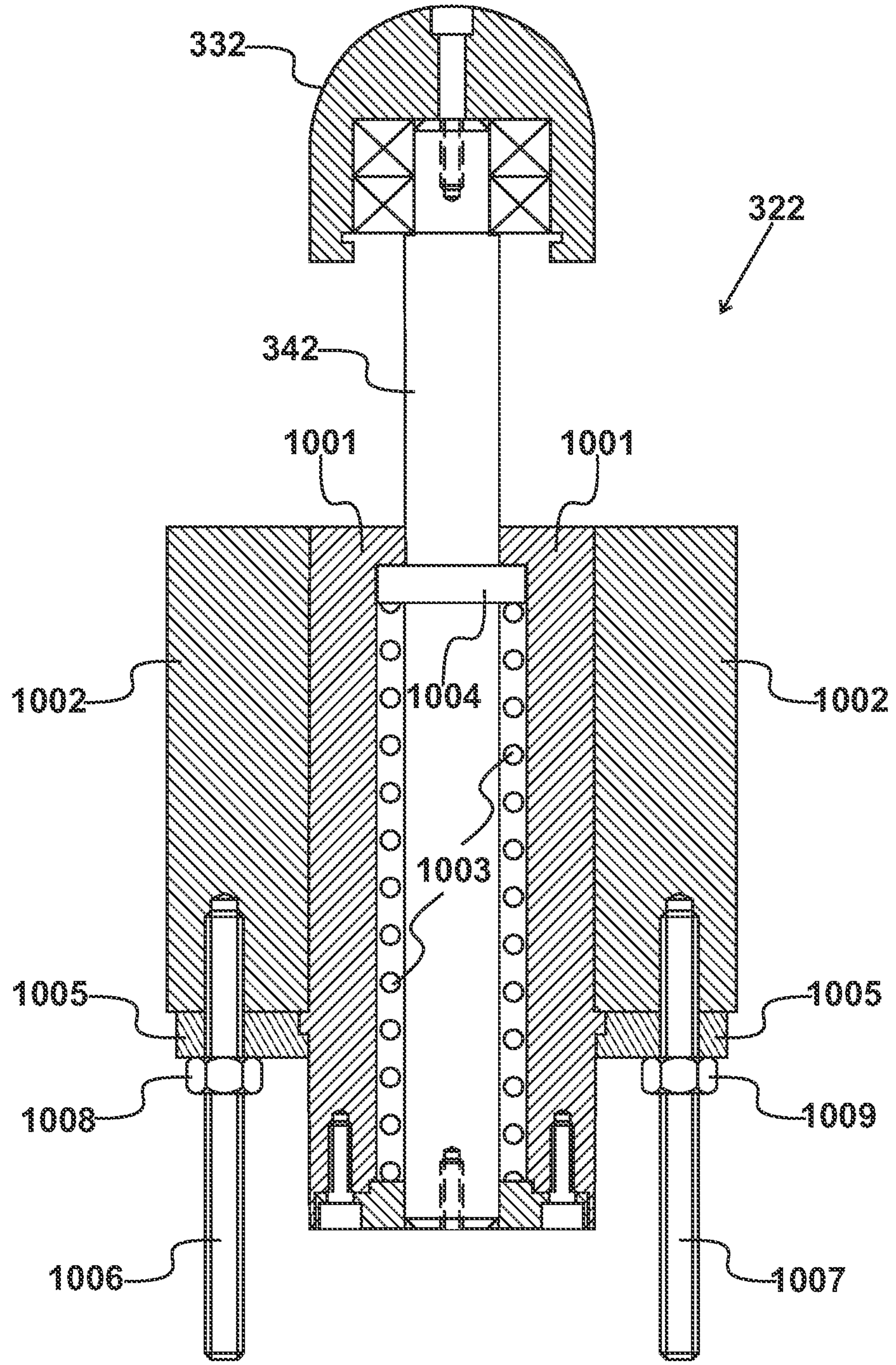
FIG. 10 is a cross-section of a buffer shown in FIG. 3.

Buffer 322 is shown in cross-section in FIG. 10. Wheel 332 is rotatably mounted on axle 342, which is housed within bearing 1001. Bearing 1001 is contained within buffer housing 1002, which is mounted on outer housing 303. Within bearing 1001 and encircling axle 342 is spring 1003. Collar 1004 on axle 342 engages with the top of spring 1003. The other buffers are similar except that buffers 321 and 323 have a longer axle and a correspondingly longer bearing.

Thus wheel 332 can be moved downwards, which compresses spring 1003, but on removal of the downward force spring 1003 will expand and return wheel 332 to its original position. In other embodiments, other methods of providing a compressible buffer biased towards the forward end of the body could be used.

Thus, returning to FIG. 9, once the final rotational position has been reached, continued pulling on cable 108 moves body 301 still further into aperture 202 by compressing the buffers that are in contact with outer surface 802, which in this example is buffers 321, 322 and 323, thus allowing the engaging latch fingers to open. When the maximum compression of the buffers has been reached, the latch has been fully inserted and pulling on cable 108 can cease. The spring-loading of the buffers then causes the latch 204 to move slightly backwards in aperture 202 until the engaging latch fingers fully engage with inner surface 803. The buffers may at this point still be slightly compressed, or may have returned to their original positions. This compressible spring loading of the buffers produces a secure latch, reducing rattle within the aperture. However, in other embodiments this could be omitted.

Buffer 322 further includes a housing base 1005, attached to the base of buffer housing 1002 using two threaded bolts 1006 and 1007. Bearing 1001 has a shoulder that engages with base 1005. Nut 1008 is threaded onto bolt 1006 and nut 1009 is threaded onto bolt 1007. Turning these nuts in one direction causes base 1005 to move away from buffer housing 1002, allowing bearing 1001 to move downwards under gravity and thus moving buffer 322 away from the wall and disengaging it. Turning them in the other direction re-engages the buffer. Disengaging the buffer is necessary to allow removal of latch 204 from aperture 202, which will be described further with reference to FIG. 14.

FIG. 11

Figure 11:
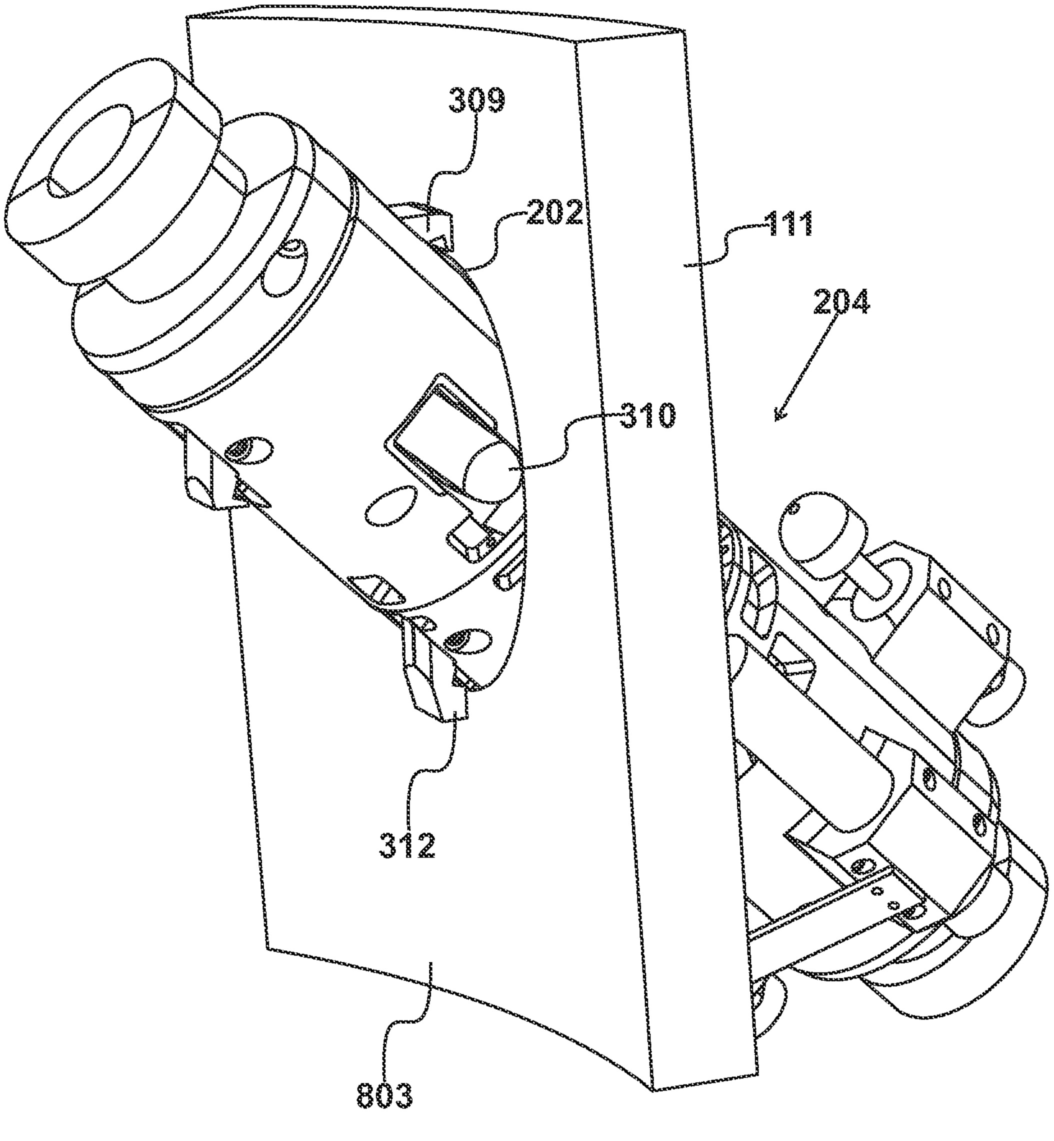
FIG. 11 is an illustration of the latch and wall shown in FIG. 2.

FIG. 11 is a view of latch 204 in position in aperture 202, with a portion of wall 111 shown. Wall 111 is curved, but latch 204 could equally be used in an aperture in a flat wall. Latch fingers 309, 310 and 312 are engaged with the inner surface 803 of wall 111 (latch finger 311 is engaged on the side that is not visible). Thus the load of the latch is equally spread between four equidistant latch fingers, ensuring that none of the fingers is subject to unnecessary fatigue.

Figure 12:
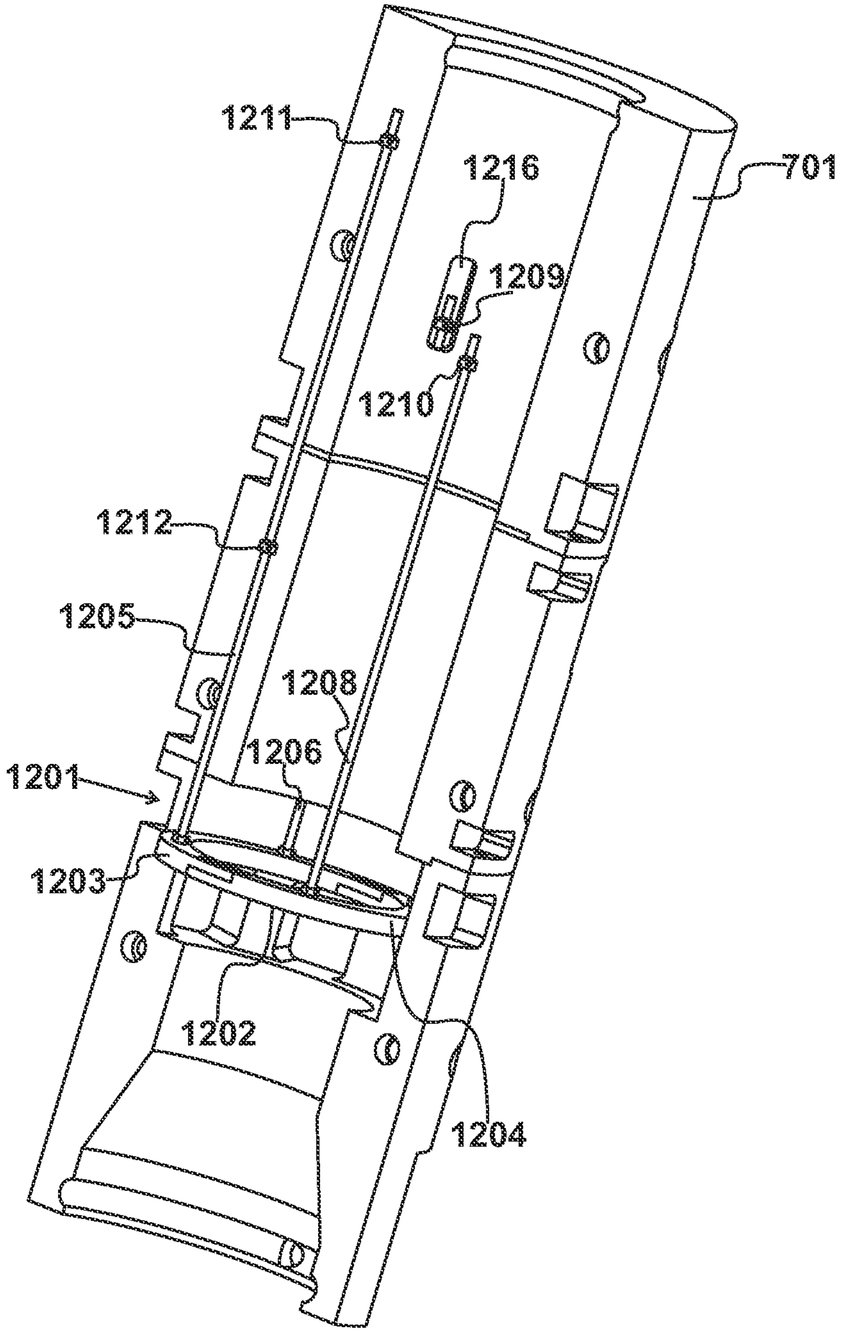
FIG. 12 is a cutaway illustration of components of the outer housing shown in FIG. 3.
Figure 13:
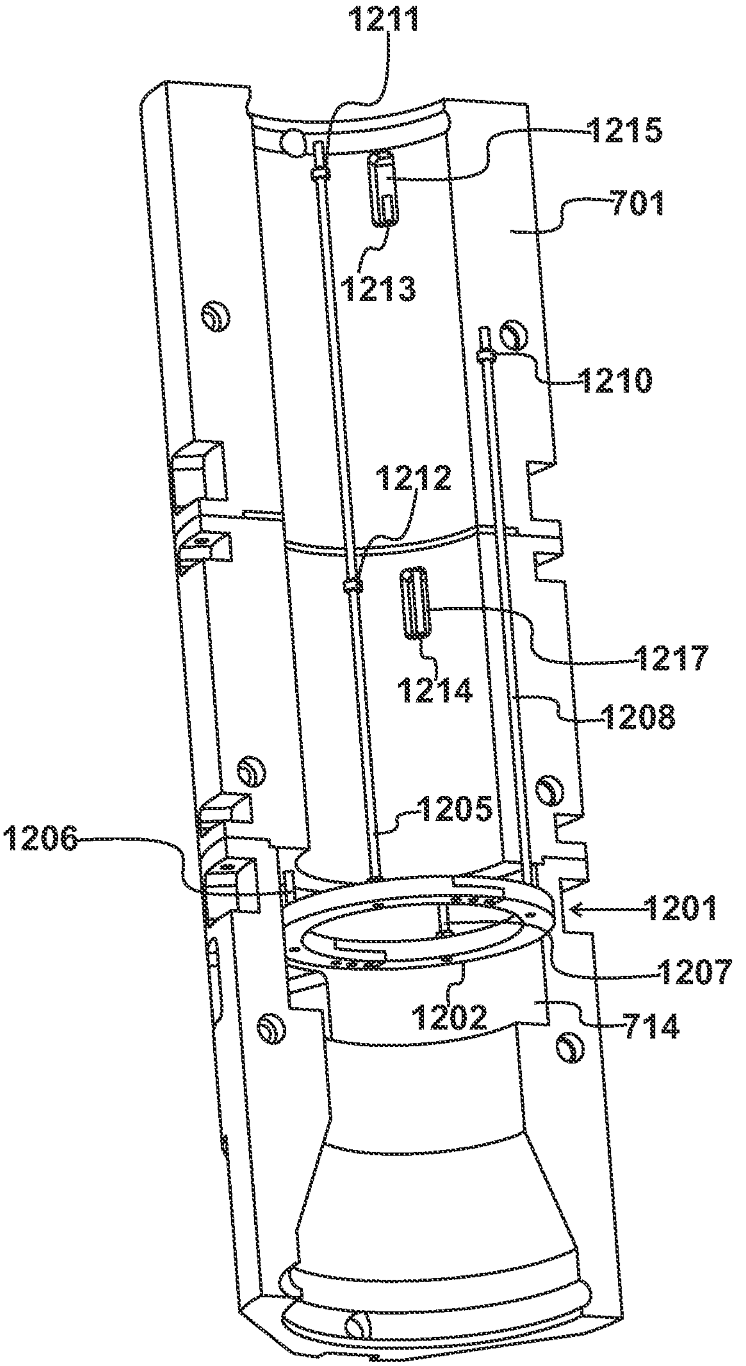
FIG. 13 is another cutaway illustration of components of the outer housing shown in FIG. 3.

FIGS. 12 and 13

It is sometimes necessary to remove a latch from a wall in which it has been installed, and therefore latch 204 includes an optional release mechanism, which moves the latch fingers into their closed position thus allowing body 301 to be removed from aperture 202. FIGS. 12 and 13 are cutaway illustrations of latch 204, each showing a view of half-shell 701 with the release mechanism inside; FIG. 12 is from slightly above and FIG. 13 is from slightly below.

Release mechanism 1201 includes a circular washer 1202 constructed from two semi-circular plates 1203 and 1204 joined together. Screwed to washer 1202 are four upstanding rods 1205, 1206, 1207 and 1208. Rods 1205 and 1207 are longer than rods 1206 and 1208.

Release mechanism 1201 is encased in outer housing 303. Washer 1202 is housed within gap 714, defined by the inner surface of outer housing 303. Each of rods 1205 to 1208 is within a cylindrical hole in outer housing 303 leading from gap 714, each hole being parallel with longitudinal axis 300 and aligned with the latch fingers. As shown in FIGS. 12 and 13, rods 1206 and 1207 are housed in half-shell 701. Rods 1205 and 1208 are housed in half-shell 702, which is not shown here.

Short rod 1206 has a collar 1209 near its tip, and similarly short rod 1208 has a collar 1210 near its tip. Long rod 1205 has a collar 1211 near its tip, and another collar 1212 nearly halfway along its length. Similarly, long rod 1207 has a collar 1213 near its tip, and another collar 1214 nearly halfway along its length.

Where each latch finger is attached to outer housing 303, there is defined a slot in the outer housing, each one communicating with one of the cylindrical holes so that a rod passes through or into it. Each collar is aligned with one slot. Thus, in half-shell 701, collars 1213, 1209 and 1214 are aligned with slots 1215, 1216 and 1217 respectively, for the top row, middle row and bottom row latch fingers respectively. Similarly (shown in FIGS. 16 and 17) in half-shell 702, collars 1211, 1210 and 1212 are aligned with slots 1218, 1219 and 1220 respectively, for the top row, middle row and bottom row latch fingers respectively. The diameter of each collar is greater than the diameter of the cylindrical holes, and thus the collars are confined to the slots.

Thus, washer 1201 can be moved up and down within outer housing 303, by an amount limited by the collars' movement within the slots.

To construct latch 204 including release mechanism 1201, it is necessary to construct outer housing 303 in pieces around inner housing 302, rather than constructing two half-shells and bolting them together. However, if it is preferred to construct the latch in situ, release mechanism 1201 can be separated into two halves, each included in a half-shell 701 or 702. To facilitate this, washer 1202 should be rotated by 90° so that each plate 1203 and 1204 is aligned with a half-shell.

A latch according to the invention need not include a release mechanism. If there will never be a need to remove the latch then the release mechanism can be omitted.

FIG. 14

Figure 14:
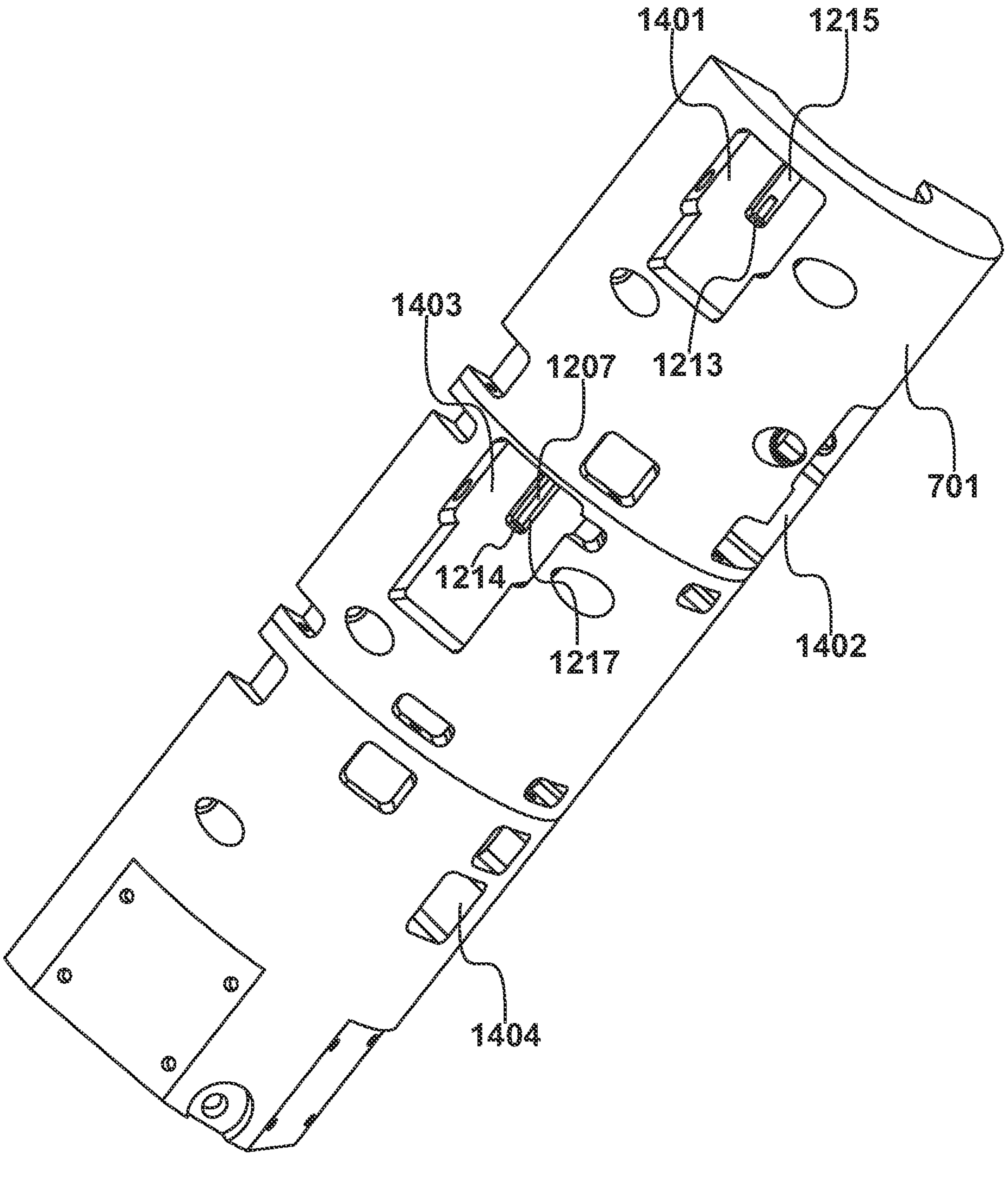
FIG. 14 is another cutaway illustration of components of the outer housing shown in FIG. 3.

FIG. 14 shows the cutaway illustration of FIGS. 12 and 13 viewed from the other side. Half-shell 701, shown here without the buffers or the latch fingers, defines recesses 1401, 1402 and 1403 in which will be rotatably mounted latch fingers 308, 310 and 312 respectively. Similarly (shown in FIGS. 16 and 17) half-shell 702 defines recesses 1404, 1405 and 1406 in which will be rotatably mounted latch fingers 309, 311 and 313 respectively. Each recess defines one of slots 1215 to 1220 in its wall; shown in this Figure are slot 1215 defined in the wall of recess 1401, and slot 1217 defined in the wall of recess 1403. Rod 1207 is visible in the slots, along with collars 1213 and 1214. As will be described with reference to FIG. 15, each latch finger has a tip at its top end, and each slot is configured to accept a tip when the latch finger is in its open position. Movement upwards of washer 1201 causes each collar to move upwards in its slot and push the corresponding tip out of the slot, thus moving the latch fingers back to a closed position.

Outer housing 303 defines four apertures, one either side of each forward buffer (and therefore on the side of the latch when it is inserted), through which a tool can be inserted and operated to move washer 1201 towards forward end 304. When removing a latch underwater, as from a monopile, a hydraulic tool would be suitable. One such aperture, aperture 1404, is visible in FIG. 4. Other means of moving the washer could be used in other embodiments.

In order to disengage the engaged latch fingers to allow them clearance to rotate back to their closed position, it is necessary to push body 301 further into aperture 202 before moving washer 1201. Typically, removal of a latch from the monopile of a wind turbine will be carried out by a diver, who would not be able to exert enough force to compress the buffers and move body 301. Therefore, as described with reference to FIG. 10, each buffer includes a means for disengaging it from outer surface 802 of wall 111 by moving it towards rearward end 305. This allows clearance for body 301 to be pushed into aperture 202 before release mechanism 1201 is operated. Thus,

FIG. 15

Figure 15:
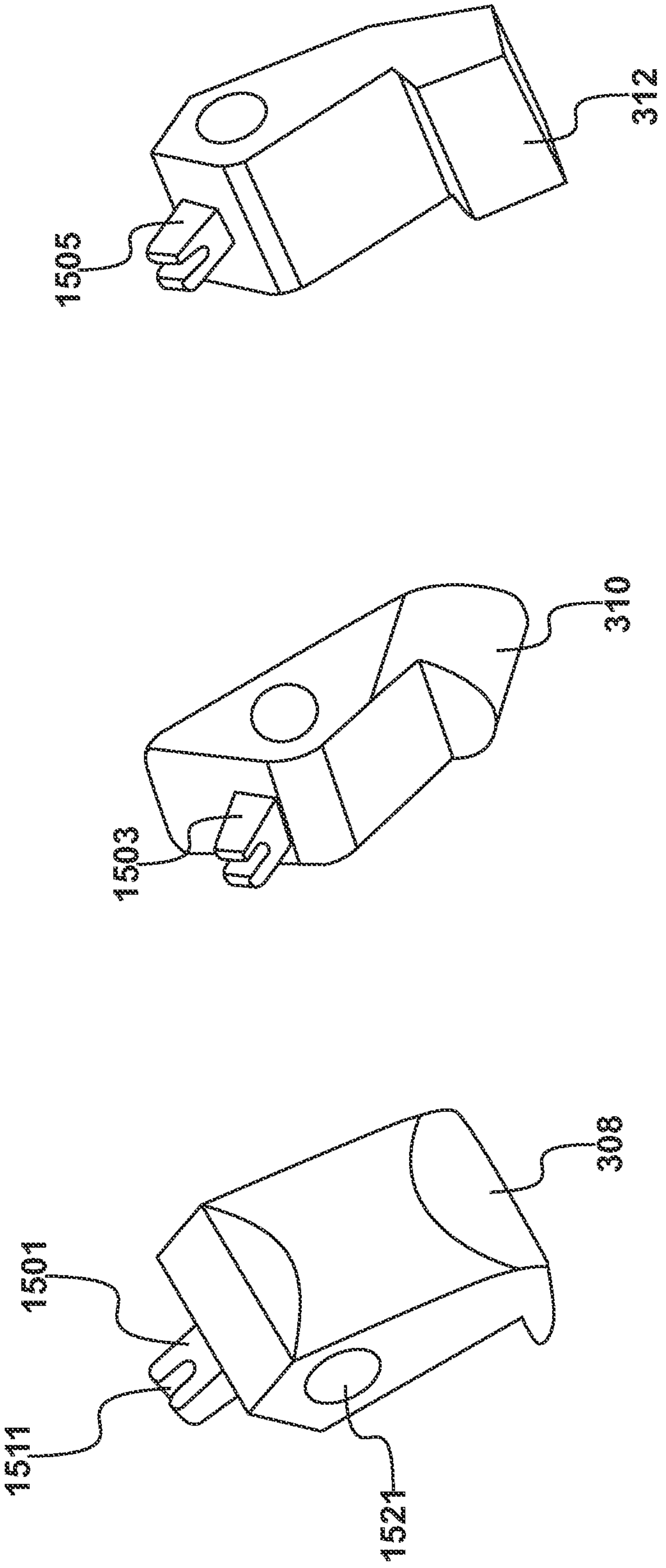
FIG. 15 is an illustration of latch fingers shown in FIG. 3.

FIG. 15 shows views of latch fingers 308 (309 is identical), 310 (311 is identical) and 312 (313 is identical), separated from latch 204 and shown from different angles, in order to illustrate their configuration.

Each latch finger 308 to 313 has a tip terminating its top end. Latch fingers 308 to 313 have tips 1501, 1502, 1503, 1504, 1505 and 1506 (not all shown in this Figure) respectively. Each tip defines an indentation; for example, tip 1501 defines indentation 1511. These indentations are shaped to receive one of rods 1205 to 1208.

Each latch finger additionally defines a cylindrical aperture to receive a pin (not shown) around which it rotates; for example, latch finger 308 defines aperture 1521. Each pin is mounted in the recess for the latch finger; for example, the pin for latch finger 308 is mounted in recess 1401. Thus, each latch finger is rotatably mounted to outer housing 303. In other embodiments, the latch fingers could be moveably attached to the outer housing in another way which allows each finger to move between an open and a closed position. For example, the latch fingers could be bolts that move inwards and outwards, potentially individually controlled by electronic means in a setting that is not in water.

Thus, in use, tip 1501 of latch finger 308 receives rod 1207 in its indentation 1511. Tip 1501 rests on collar 1213. When release mechanism 1201 is operated by moving washer 1202 towards forward end 304, rod 1207 and thus collar 1213 also move towards forward end 304. Collar 1213 pushes tip 1501 out of slot 1217, and thus moves latch finger 308 into a closed position. The other latch fingers are similarly configured, and therefore are also moved into the closed position at the same time.

Thus, there is disclosed a release mechanism in which each said latch finger comprises a tip terminating its top end, and the outer housing defines a plurality of recesses aligned with said tips, such that for each latch finger, its tip is received within an aperture when the latch finger is in the open position. Each tip can be pushed out of its respective aperture, thus moving each latch finger to the closed position. In this embodiment the latch includes a plurality of rods, each defining at least one bead, each bead aligned with one of the tips with respect to the longitudinal axis. When the rods are moved towards the forward end, each bead engages with a tip and pushes it out of its respective recess. In this way, the latch fingers are moved to the closed position. Other methods of pushing the tips out of their apertures may be used. In this embodiment each bead is a collar on the rod, but the bead may for example be a protrusion on the rod, possibly integrally formed or attached later. It may go around the whole circumference of the rod or protrude in only one direction.

When force on washer 1202 is released, it moves towards rearward end 304, back to its original position. This allows all the latch fingers to return to their open position, towards which they are biased. This biasing is facilitated by a torsion spring (not shown) for each latch finger.

In this embodiment the rods all have the same diameter and therefore the indentations in the tips are substantially identical. This may not be the case in other embodiments. In still further embodiments, where the release mechanism is different, the tips may not have indentations. For example, the release mechanism may be designed so that the rods pass by the tips, rather than being received in them.

Figure 16:
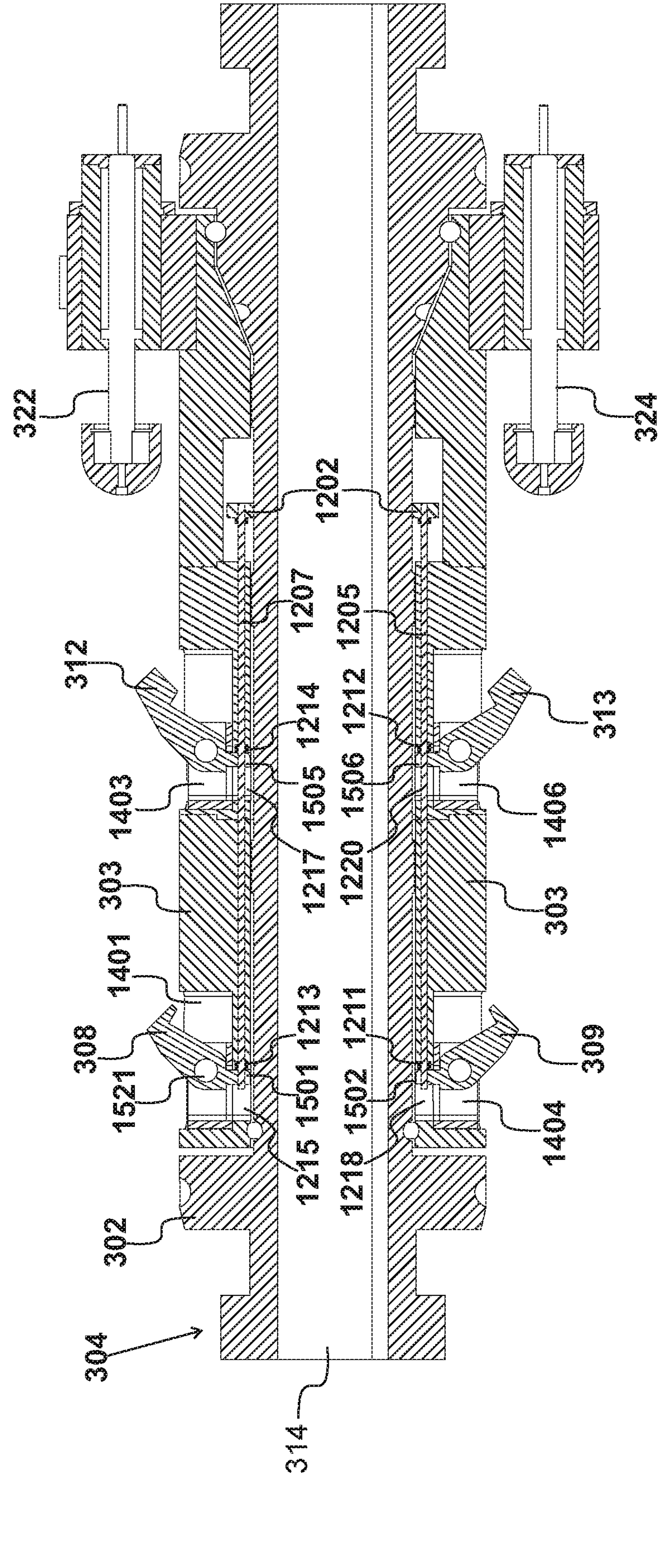
FIG. 16 is a cross-section of the latch shown in FIG. 3.
Figure 17:
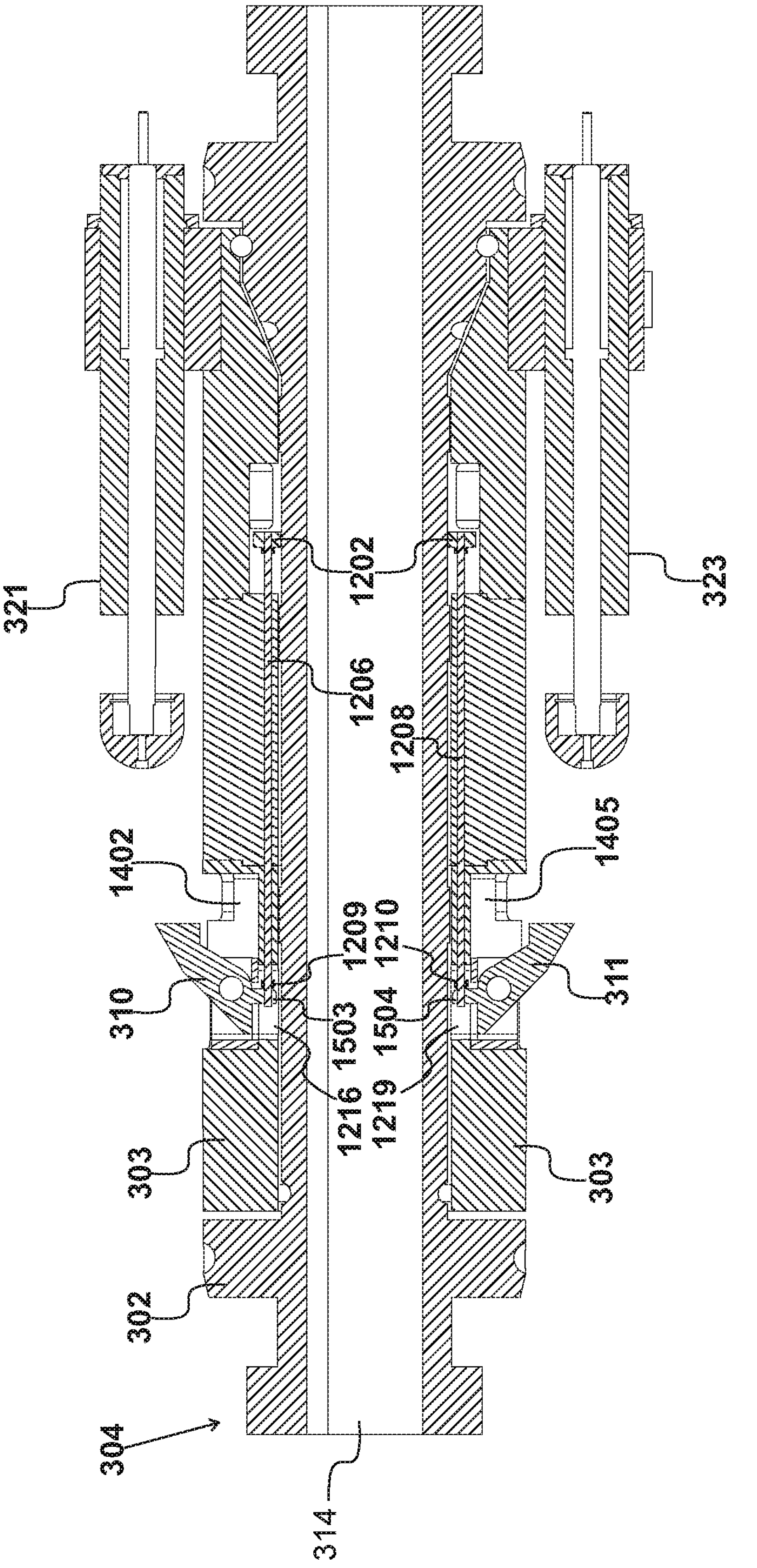
FIG. 17 is another cross-section of the latch shown in FIG. 3.

FIGS. 16 and 17

FIGS. 16 and 17 are cross-sections of latch 204, taken along two mutually orthogonal planes each containing longitudinal axis 300. In these cross-sections the latch is not in position, and therefore buffers 321 to 324 are not compressed.

Outer housing 303 rotates around inner housing 302, which defines an internal bore 314. Buffers 321 to 324 are mounted on outer housing 303. Recesses 1401 to 1406 are defined in the outer surface of outer housing 303, in which latch fingers are rotatably mounted. Thus, latch finger 308 is mounted in recess 1401, latch finger 309 is mounted in recess 1402, latch finger 310 is mounted in recess 1403, latch finger 311 is mounted in recess 1405, latch finger 312 is mounted in recess 1403, and latch finger 313 is mounted in recess 1406. Each latch finger is rotatably mounted on a pin at its top end. For example, latch finger 308 is rotatably mounted on pin 1521.

In the open position, each tip is received in a slot defined in the wall of its respective recess. Thus, tip 1501 of latch finger 308 is received in slot 1215 in the wall of recess 1504. Similarly, the tips 1502 to 1506 of latch fingers 309 to 313 respectively are received in slots 1218, 1216, 1219, 1217 and 1220 respectively.

Rod 1207 passes through indentation 511 in the tip of latch finger 308 and a similar indentation in latch finger 312, with collars 1213 and 1214 just underneath the tips. Rod 1205 passes through indentations in the tips of latch fingers 309 and 313, with collars 1211 and 1212 just underneath the tips. Rod 1206 passes through an indentation in the tip of latch finger 310, with collar 1209 just underneath the tip. Rod 1208 passes through an indentation in the tip of latch finger 311, with collar 1210 just underneath the tip. All four rods are attached to washer 1202.

Figure 18:
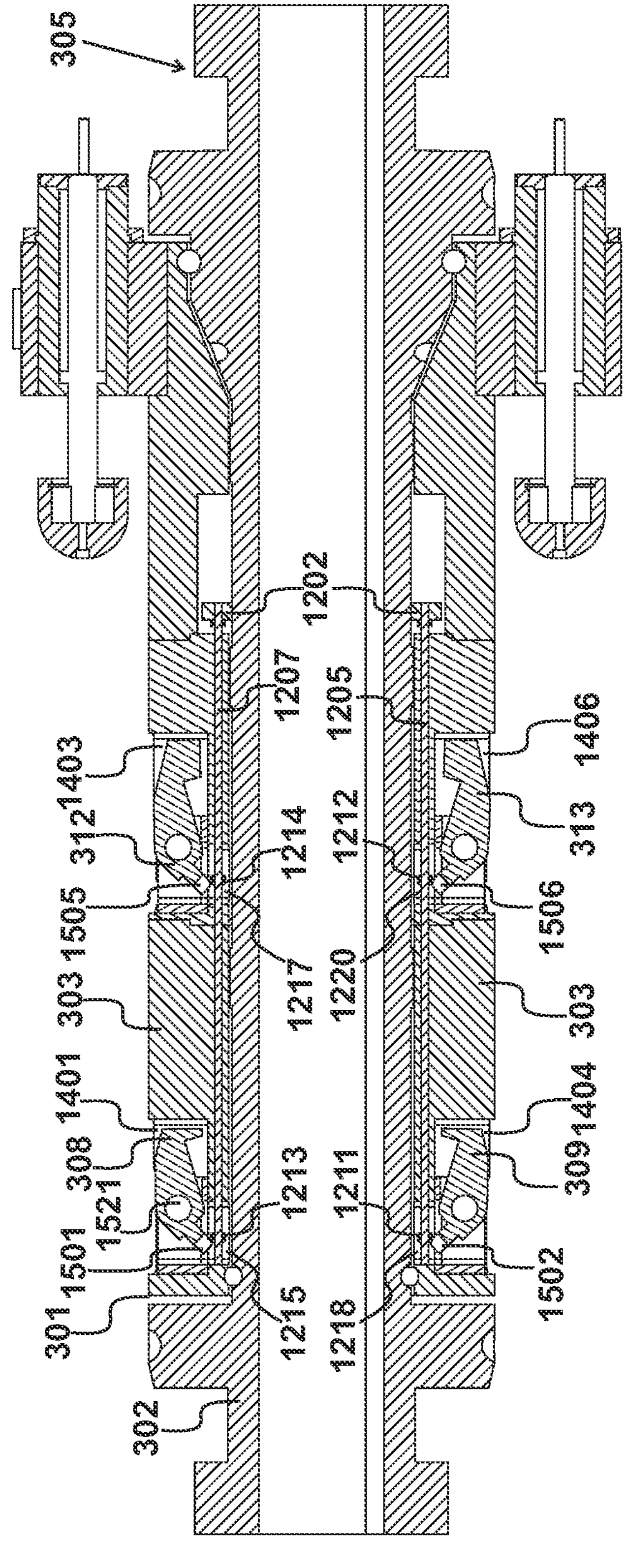
FIG. 18 is a cross-section of the latch shown in FIG. 3 after a release mechanism has been operated.
Figure 19:
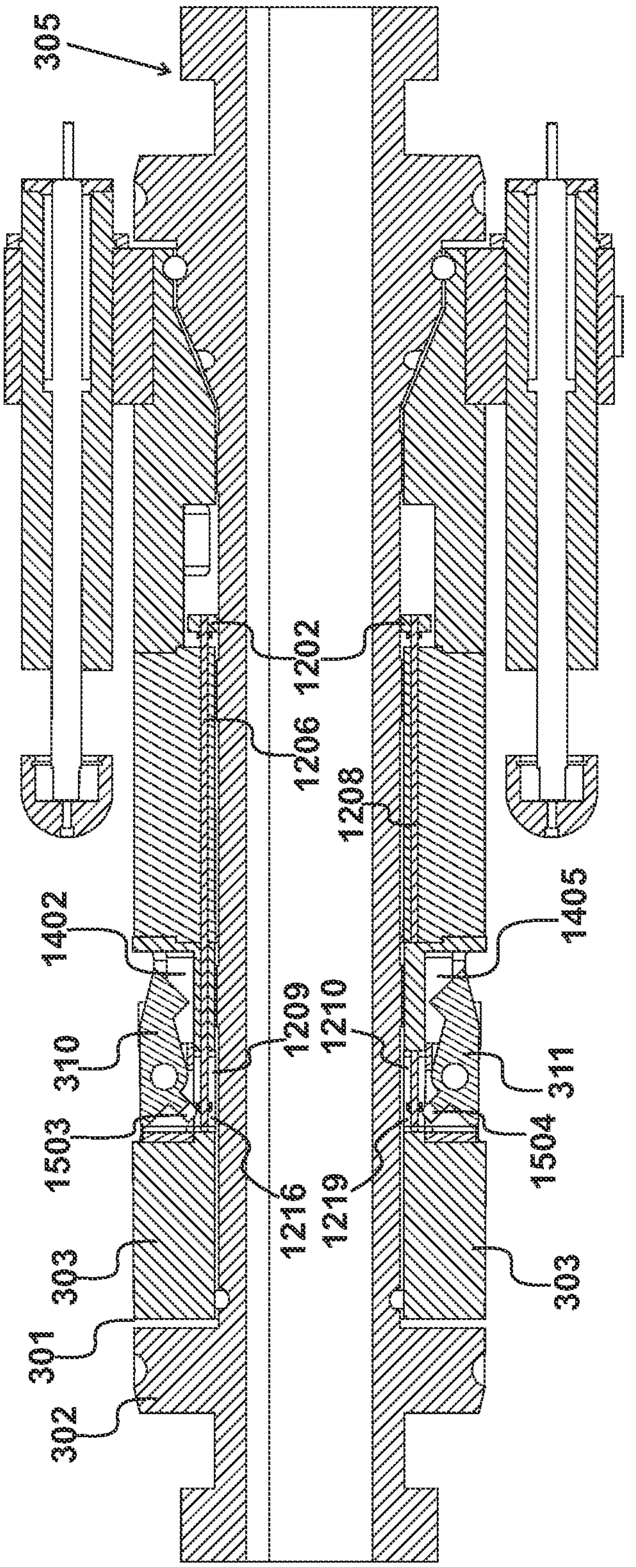
FIG. 19 is another cross-section of the latch shown in FIG. 3 after a release mechanism has been operated.

FIGS. 18 and 19

FIGS. 18 and 19 show the same cross-sections when washer 1202 has been moved towards forward end 304. The collars have pushed their respective tips out of their slots, and all the latch fingers have rotated around their respective pins, such as pin 1521 for latch finger 308, to move to a closed position within their respective recesses. The outer circumference of body 301 is now such that, if it is in place in an aperture, it can be pulled out of the aperture in the direction of rearward end 306.

FIG. 20

Figure 20:
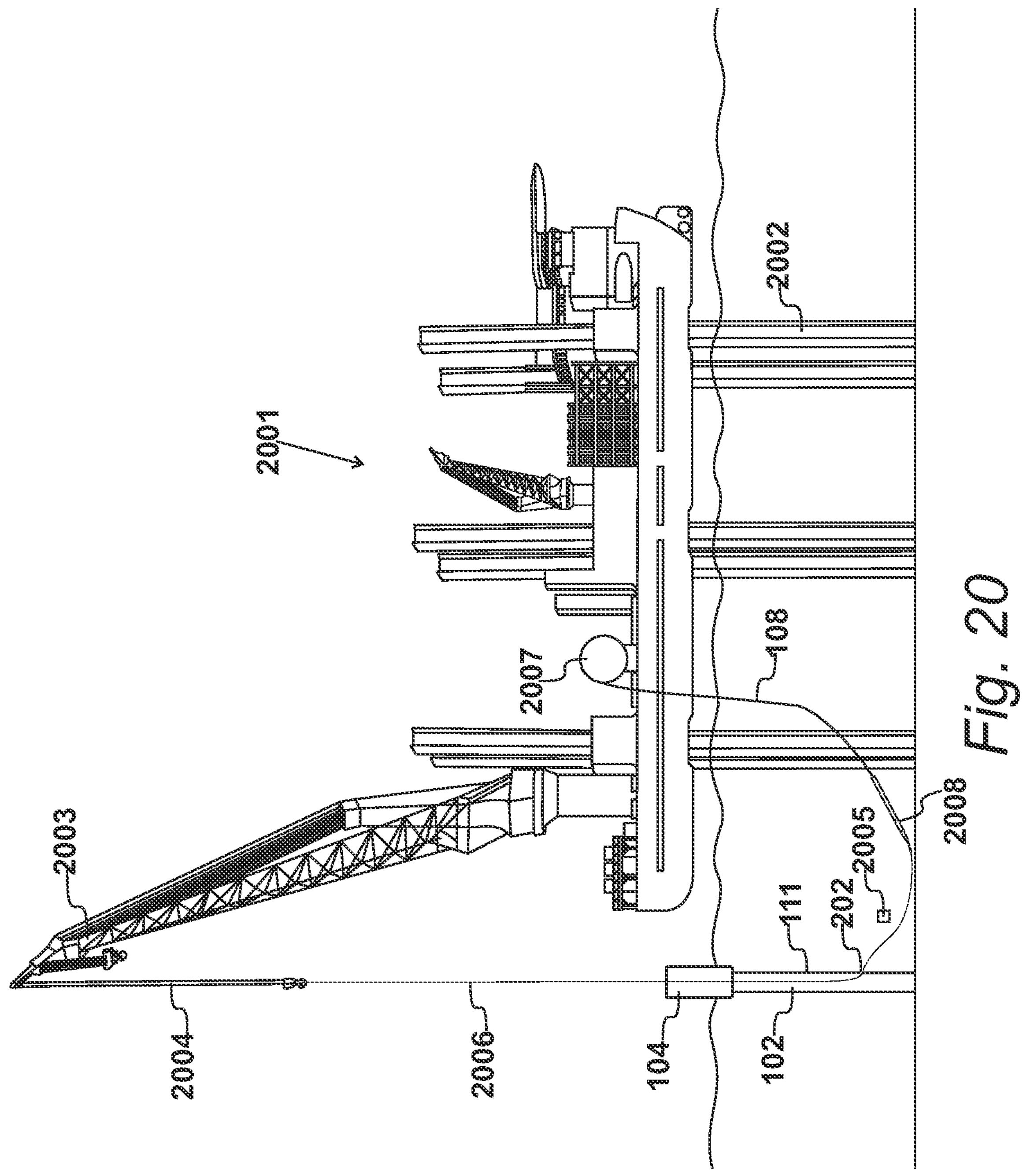
FIG. 20 illustrates installation of a wind turbine shown in FIG. 1.

Installation of cable 108 in monopile 102 is illustrated in FIG. 20. Typically, such installation is carried out by a self-elevating installation vessel 2001. This is a boat that, after navigating to the required position offshore, elevates itself on a number of legs, such as leg 2002. This ensures that the vessel is kept in position during installation of wind turbines and provides a foundation for the lifting of the heavy components. However, for the installation of cable an anchored boat may be sufficient.

Vessel 2001 has a crane 2003 including a hoist rope 2004. Underwater, the installation is assisted by a remotely operated underwater vehicle (ROV) 2005. This is wirelessly connected to control equipment on board vessel 1001, for control by an operator. It includes a camera to provide an underwater view to the operator.

Before the cable is installed, a messenger wire 2006 is fed through the monopile and out through aperture 202 with the assistance of ROV 2005, and the underwater end is then passed back up to installation vessel 2001. The other end is attached to hoist rope 2004.

Cable 108 is held on spool 2007 on vessel 1001. On the vessel, a cable protection assembly 2008 is added to the end of cable 108, comprising bend restrictor 203, latch 204 and bend stiffener 205. The end of cable 108 is fed through latch 204, or alternatively a latch 204 may be formed around the cable by bolting together two sets of half-shells. Bend stiffener 205 is added by bolting two half-shells together around cable 108 and knuckle 306, and bend restrictor 206 is added by bolting two half-shells together around cable 108 and knuckle 306.

Cable 108 is attached with a breakable attachment to the front end of bend stiffener 205, and is then attached to messenger line 2006. By pulling on hoist rope 2006, messenger line 2006 and cable 108 are pulled through aperture 202 until latch is fully engaged, as described with reference to FIG. 9. Outer housing 303 automatically rotates into position as body 301 is pulled through the aperture, such that its latch fingers are rotated into a predetermined position in which they optimally engage with the inside of monopile wall 111.

Once the engaging buffers of latch 204 have been fully compressed, it is not possible to pull body 301 any further through aperture 202. The continued pulling on hoist rope 2004 causes the breakable attachment between cable 108 and bend stiffener 203 to break. Latch 204 then settles into its final engaged position. Cable 108, now running free through protection assembly 2008, is then pulled upwards to platform 104. The cable is then secured and the messenger wire 1006 disengaged.

The remainder of the cable is then unspooled to the seabed before being buried. Typically, installation vessel 1001 includes a trenching unit or other cable burial equipment.

Thus, there is described herein a method of installing an electrical cable in an offshore wind turbine having a support structure, which in this example is monopile 202. It comprises the steps of attaching a clamp, which in this example is clamp 204, to the cable, and attaching a bend stiffener, which in this example is bend stiffener 205, to the back end of the clamp such that it surrounds the cable. The cable is passed into the support structure, such that the clamp enters structure front end first, and pulled upwards until it reaches a desired height.

Thus, there is described herein a method of locating a latch within an aperture in a wall, which in this example is wall 111 of monopile 102. It comprises the steps of obtaining a latch, which in this example is latch 204, and inserting the body of the latch into the aperture, allowing the guide to rotate during insertion until the outer housing has reached a predetermined position. Insertion of the body is continued until a plurality of latch fingers are in an open position, preventing removal of the body from the aperture.

The invention claimed is:

1. A latch, comprising:
- a body having a forward end, a rearward end and a longitudinal axis, configured to be inserted into an aperture by said forward end of said body in a first direction parallel to said longitudinal axis, said body comprising:
  - an inner part, and
  - an annular outer housing surrounding at least part of said inner part and rotatable around said inner part;
- a plurality of latch fingers moveably attached to said annular outer housing, each of said plurality of latch fingers moveable between a closed position and an open position, such that in said open position a latch finger of said plurality of latch fingers prevents removal of said body from said aperture in a direction opposite to said first direction; and
- a guide attached to said body and configured to bias rotation of said annular outer housing, when said body is inserted into said aperture, to one of a set of at least one predetermined rotational positions, thereby also locating said plurality of latch fingers in a predetermined position.

2. The latch of claim 1, wherein said guide is attached to and rotates with said annular outer housing.

3. The latch of claim 1, wherein said guide comprises at least one buffer, said at least one buffer comprising a buffer end configured to prevent said rearward end from being inserted into said aperture.

4. The latch of claim 3, wherein said at least one buffer further comprises a support to which said buffer end is attached, and said support is attached to said annular outer housing.

5. The latch of claim 4, wherein said buffer end is a wheel, and said support is an axle on which said wheel is rotatably mounted such that said wheel rotates around an axis parallel to said longitudinal axis.

6. The latch of claim 3, wherein said buffer end is biased towards said forward end of said body, and said at least one buffer is compressible such that said buffer end is configured to be moved towards said rearward end of said body.

7. The latch of claim 3, wherein said at least one buffer comprises at least two buffers, and ends of said at least two buffers are offset from each other with respect to said longitudinal axis.

8. The latch of claim 3, wherein:
- said at least one buffer comprises four buffers, located equidistantly around a circumference of said body such that there exist a first pair of buffers opposite each other and a second pair of buffers opposite each other; and
- for said first pair of buffers, ends of said first pair of buffers are opposite each other with respect to said longitudinal axis, and offset from ends of said second pair of buffers such that said ends of said first pair of buffers are closer to said forward end than said end of at least one of said second pair of buffers.

9. The latch of claim 1, wherein said plurality of latch fingers are arranged in three rows relative to said longitudinal axis, such that there is a top row closest to said forward end, a middle row, and a bottom row closest to said rearward end, configured such that when said body is fully inserted into said aperture in a wall, at least one latch finger from each row is in said open position and in contact with a surface of said wall.

10. The latch of claim 9, wherein:

each of said plurality of latch fingers in said top row and said bottom row is rotatably mounted to said annular outer housing at a top end of said latch finger, and has a flat surface at a base of said latch finger;

each of said plurality of latch fingers in said top row is configured such that when said latch finger is in said open position, said base of said latch finger is at an acute angle to said longitudinal axis, measured from said forward end; and each of said plurality of latch fingers in said bottom row is configured such that when said latch finger is in said open position, said base of said latch finger is at an oblique angle to said longitudinal axis, measured from said forward end.

11. The latch of claim 9, wherein each of said plurality of latch fingers in said middle row is rotatably mounted to said annular outer housing at a top end of said latch finger, and has a curved surface at a base of said latch finger.

12. The latch of claim 1, wherein each of said plurality of latch fingers is individually biased towards said open position of said latch finger.

13. The latch of claim 1, wherein:

each of said plurality of latch fingers comprises a tip terminating a top end of said latch finger, and said annular outer housing defines a plurality of recesses aligned with said tips, such that for each of said plurality of latch fingers, said tip of said latch finger is received within said aperture when said latch finger is in said open position.

14. The latch of claim 13, further comprising a plurality of rods, each of said plurality of rods defining at least one bead, each of said at least one bead aligned with one of said tips with respect to said longitudinal axis;

such that when said plurality of rods are moved towards said forward end, each of said at least one bead engages with a tip and pushes said at least one bead out of a respective recess of said annular outer housing, thus moving said respective latch finger to said closed position.

15. The latch of claim 1, wherein said inner part is annular, having a cylindrical internal bore along a length of said inner part.

16. A method of locating a latch within an aperture in a wall, said latch comprising:

a body having a forward end, a rearward end and a longitudinal axis, configured to be inserted into said aperture by said forward end of said body in a first direction parallel to said longitudinal axis, said body comprising:

an inner part, and an annular outer housing surrounding at least part of said inner part and rotatable around said inner part;

a plurality of latch fingers moveably attached to said annular outer housing, each of said plurality of latch fingers moveable between a closed position and an open position, such that in said open position a latch finger of said plurality of latch fingers prevents removal of said body from said aperture in a direction opposite to said first direction; and a guide attached to said body and configured to bias rotation of said annular outer housing, when said body is inserted into said aperture, to one of a set of at least one predetermined rotational positions, thereby also locating said plurality of latch fingers in a predetermined position;

the method comprising steps of:

inserting said body of said latch into said aperture, allowing said guide to rotate during insertion until said annular outer housing has reached said of said set of at least one predetermined rotational positions;

and continuing insertion of said body until said plurality of latch fingers are in said open position, preventing removal of said body from said aperture.

17. The method of claim 16, further comprising steps of:

placing a first pair of half-shells around a cable and attaching said first pair of half-shells to each other, to form said inner part, placing a second pair of half-shells around said inner part and attaching said second pair of half-shells to each other, to form said annular outer housing, and attaching said latch to said cable; and said step of inserting said body into said aperture comprises a step of inserting an end of said cable and pulling said end of said cable through said aperture, thus also pulling said body into said aperture.

18. The method of claim 17, further comprising steps of:

pushing tips of said plurality of latch fingers out of respective apertures to move all of said plurality of latch fingers to said closed position; and removing said body of said latch from said aperture.

* * * * *